United States Patent
Cai et al.

(10) Patent No.: US 12,356,025 B2
(45) Date of Patent: Jul. 8, 2025

(54) MULTI-USER LIVE STREAMING METHOD, TERMINAL, SERVER, AND STORAGE MEDIUM

(71) Applicant: BIGO TECHNOLOGY PTE. LTD., Singapore (SG)

(72) Inventors: Siyuan Cai, Guangzhou (CN); Siyang Xiao, Guangzhou (CN); Peixun Zhong, Guangzhou (CN)

(73) Assignee: BIGO TECHNOLOGY PTE. LTD., Singapore (CN)

( * ) Notice: Subject to any disclaimer, the term of this patent is extended or adjusted under 35 U.S.C. 154(b) by 93 days.

(21) Appl. No.: 18/247,414

(22) PCT Filed: Sep. 1, 2021

(86) PCT No.: PCT/CN2021/116048
§ 371 (c)(1),
(2) Date: Mar. 30, 2023

(87) PCT Pub. No.: WO2022/083305
PCT Pub. Date: Apr. 28, 2022

(65) Prior Publication Data
US 2023/0412853 A1 Dec. 21, 2023

(30) Foreign Application Priority Data
Oct. 19, 2020 (CN) .......................... 202011120789.6

(51) Int. Cl.
H04N 21/2187 (2011.01)
H04N 21/431 (2011.01)
H04N 21/4788 (2011.01)

(52) U.S. Cl.
CPC ....... *H04N 21/2187* (2013.01); *H04N 21/431* (2013.01); *H04N 21/4788* (2013.01)

(58) Field of Classification Search
CPC .... H04N 21/431; H04N 21/2187; H04N 7/15; H04N 21/2407; H04N 21/478; H04L 65/1093; H04L 65/1069; H04L 65/403
See application file for complete search history.

(56) References Cited

U.S. PATENT DOCUMENTS

2008/0172463 A1  7/2008  Qin et al.
2011/0286716 A1  11/2011  Alderson
(Continued)

FOREIGN PATENT DOCUMENTS

CN  108289225 A  7/2018
CN  108574879 A  9/2018
(Continued)

OTHER PUBLICATIONS

Extended European Search Report Communication Pursuant to Rule 62 EPC for European Application No. 21881724.5 dated Jan. 19, 2024, which is a foreign counterpart application to this application.

International Search Report of the International Searching Authority for State Intellectual Property Office of the People's Republic of China in PCT application No. PCT/CN2021/116048 issued on Nov. 26, 2021, which is an International application to which this application claims priority.

(Continued)

*Primary Examiner* — Ngoc K Vu
(74) *Attorney, Agent, or Firm* — Kolitch Romano Dascenzo Gates LLC

(57) ABSTRACT

Provided is a multi-user live streaming method, applicable to a terminal. The method includes: displaying a live streaming interface of a first live streaming room; displaying, in response to the first live streaming room satisfying a live streaming room consolidation condition, a consolidation selection list; sending, in response to a select operation on a target client in the consolidation selection list, a live streaming room consolidation request to the target client via a server; and displaying, in the live streaming interface of the first live streaming room, the target client added to the first live streaming room.

19 Claims, 14 Drawing Sheets

(56) References Cited

U.S. PATENT DOCUMENTS

| | | | |
|---|---|---|---|
| 2013/0127979 A1 | 5/2013 | Koh et al. | |
| 2014/0160223 A1 | 6/2014 | Bieselt et al. | |
| 2015/0113591 A1 | 4/2015 | Feng et al. | |
| 2015/0256353 A1 | 9/2015 | Busey et al. | |
| 2018/0352303 A1 | 12/2018 | Siddique et al. | |
| 2021/0352336 A1* | 11/2021 | Qiao | H04N 21/47208 |
| 2022/0086509 A1* | 3/2022 | Geng | H04N 21/47815 |

FOREIGN PATENT DOCUMENTS

| | | | | |
|---|---|---|---|---|
| CN | 109246442 A | | 1/2019 | |
| CN | 109756747 A | | 5/2019 | |
| CN | 111385592 A | | 7/2020 | |
| CN | 112468831 A | | 3/2021 | |
| CN | 111212295 B | * | 4/2022 | H04N 21/2187 |
| RU | 2374771 C2 | | 11/2009 | |
| RU | 2604418 C2 | | 12/2016 | |

OTHER PUBLICATIONS

The State Intellectual Property Office of People's Republic of China, First Office Action in Patent Application No. CN202011120789.6 issued on Apr. 25, 2022, which is a foreign counterpart application corresponding to this U.S. Patent Application, to which this application claims priority.

The State Intellectual Property Office of People's Republic of China, Second Office Action in Patent Application No. CN202011120789.6 issued on Sep. 9, 2022, which is a foreign counterpart application corresponding to this U.S. Patent Application, to which this application claims priority.

First Office Action and Search Report in Russian Patent Application No. 2023109305 issued on Jul. 5, 2024, which is a foreign counterpart application.

* cited by examiner

MULTI-USER LIVE STREAMING METHOD, TERMINAL, SERVER, AND STORAGE MEDIUM

CROSS-REFERENCE TO RELATED APPLICATION

The present application is a U.S. national phase application of international application No. PCT/CN2021/116048, filed on Sep. 1, 2021, which claims priority to Chinese Patent Application No. 202011120789.6 filed on Oct. 19, 2020 and entitled "MULTI-USER LIVE BROADCAST METHOD AND DEVICE, TERMINAL, SERVER, AND STORAGE MEDIUM", the disclosures of which are incorporated herein by reference in their entireties.

TECHNICAL FIELD

Embodiments of the present disclosure relate to the technical field of computers technology, and in particular to a multi-user live streaming method, a terminal, a server, and a storage medium.

BACKGROUND OF THE INVENTION

With the rapid development of Internet technology, live streaming becomes one of the important ways of leisure and entertainment. In the multi-user live streaming in the form of a video or voice chat room, the host may invite other users to connect as a guest upon opening the live streaming room, and the other users may also apply for joining the connection or enter the live room as audiences to watch the living streaming contents.

SUMMARY OF THE INVENTION

Embodiments of the present disclosure provide a multi-user live streaming method and apparatus, a terminal, a server, and a storage medium. The technical solutions are as follows.

According to some embodiments of the present disclosure, a multi-user live streaming method is provided. The method is applicable to a terminal, and includes:
  displaying a live streaming interface of a first live streaming room, wherein the first live streaming room is created by a first client and is configured to allow the first client to communicate with other clients by audio or video;
  displaying, in response to the first live streaming room satisfying a live streaming room consolidation condition, a consolidation selection list, wherein the consolidation selection list includes a client identification of at least one second client, the second client creates a second live streaming room, and the second live streaming room satisfies the live streaming room consolidation condition;
  sending, in response to a select operation on a target client in the consolidation selection list, a live streaming room consolidation request to the target client via a server, wherein the server is configured to close a live streaming room created by the target client in response to receiving an acceptance response of the consolidation request from the target client, and add the target client to the first live streaming room; and
  displaying, in the live streaming interface of the first live streaming room, the target client added to the first live streaming room.

According to some embodiments of the present disclosure, a multi-user live streaming method is provided. The method is applicable to a terminal, and includes:
  displaying a live streaming interface of a second live streaming room, wherein the second live streaming room is created by a second client and is configured to allow the second client to communicate with other clients by audio or video;
  receiving and displaying a live streaming room consolidation request from a first client via a server, wherein the live streaming room consolidation request is generated by the first client in response to receiving a select operation on the second client in a consolidation selection list;
  sending, in response to an accept operation on the live streaming room consolidation request, an acceptance response of the consolidation request to the server, wherein the server is configured to add the second client to a first live streaming room in a response to receiving the acceptance response of the consolidation request, and the first live streaming room is created by the first client; and
  closing the second live streaming room, and displaying a live streaming interface of the first live streaming room.

According to some embodiments of the present disclosure, a multi-user live streaming method is provided. The method is applicable to a server, and includes:
  receiving a live streaming room consolidation request from a first client, wherein the live streaming room consolidation request is generated by the first client in response to receiving a select operation on a target client in a consolidation selection list, the consolidation selection list is displayed in response to a first live streaming room created by the first client satisfying a live streaming room consolidation condition, the consolidation selection list includes a client identification of at least one second client, the second client creates a second live streaming room, and the second live streaming room satisfies the live streaming room consolidation condition;
  sending the live streaming room consolidation request to the target client; and
  closing, in response to receiving an acceptance response of the consolidation request from the target client, a live streaming room of the target client, and adding the target client to the first live streaming room.

According to some embodiments of the present disclosure, a terminal is provided, wherein the terminal includes a processor and a memory. The memory stores at least one instruction, at least one program, a code set, or an instruction set. The processor, when loading and executing the at least one instruction, the at least one program, the code set, or the instruction set, is caused to perform the multi-user live streaming method according to the above aspects.

According to some embodiments of the present disclosure, a server is provided. The server includes a processor and a memory. The memory stores at least one instruction, at least one program, a code set, or an instruction set. The processor, when loading and executing the at least one instruction, the at least one program, the code set, or the instruction set, is caused to perform the multi-user live streaming method according to the above aspect.

According to some embodiments of the present disclosure, a non-volatile computer readable storage medium is provided, wherein the non-volatile computer readable storage medium stores at least one instruction, at least one program, a code set, or an instruction set. A processor, when loading and executing the at least one instruction, the at least one program, the code set, or the instruction set, is caused to perform the multi-user live streaming method according to the above aspect.

DETAILED DESCRIPTION

For clearer descriptions of the objects, technical solutions, and advantages of the present disclosure, the embodiments of the present disclosure are further described in detail below with reference to the drawings.

The mentioned term "a plurality of" herein means two or more. The term "and/or" describes the association relationship of the associated objects, and indicates that three relationships are present. For example, A and/or B indicates that: only A is present, both A and B are present, and only B is present. The symbol "/" generally indicates an "or" relationship between the associated objects.

In the related art, after a user starts the multi-user live streaming and becomes a live streamer, the user can share the live streaming room with friends, or display the live streaming room through a live streaming recommendation list of a live streaming platform to improves the exposure rate of the live streaming room and attract other users to join connection or watching the live streaming. However, for the approaches that attract the audiences by sharing and/or displaying the live streaming rooms in the live streaming recommendation list of a live streaming platform, the live streaming rooms cannot be accurately recommended to interested users, and further the competitiveness of the live streaming rooms with a relatively less quantity of guests and audiences is relatively low, as a result, the live streamers of such live streaming rooms may end the live streaming, and the utilization rate of the live streaming function is not improved.

Figure 1:
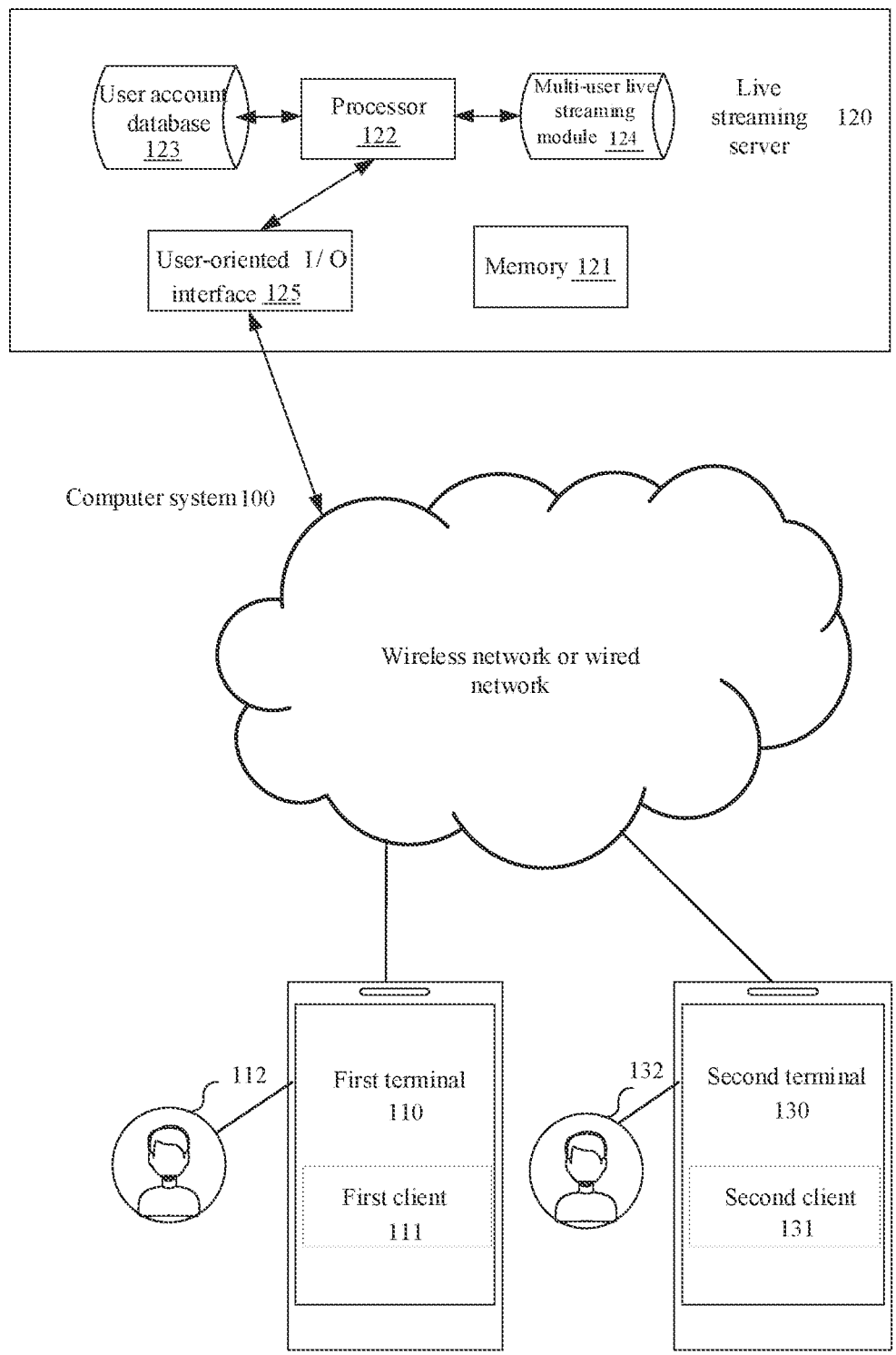
FIG. 1 is a schematic diagram of an implementation environment according to some embodiments of the present disclosure.

In order to solve the problems in the related art described above, the present disclosure provides a multi-user live streaming method, wherein a server consolidates the live streaming rooms satisfying a live streaming room consolidation condition, a target client is added to a first live streaming room, and a second live streaming room created by the target client is closed, such that the engagement rate and the interaction rate of the first live streaming room are increased, and other users can be attracted to enter the first live streaming room, thereby preventing live streamers of both the first live streaming room and the second live streaming room from stopping using a multi-user live streaming function due to a relatively less quantity of users entering the two live streaming rooms. In addition, the second live streaming room is closed, such that the usage rate of the multi-user live streaming function is improved, and the data processing burden on the server can also be reduced, thereby avoiding the waste of resources. As shown in FIG. 1, which is a schematic diagram of an implementation environment according to some embodiments of the present disclosure. The implementation environment includes: a first terminal 110, a live streaming server 120, and a second terminal 130.

The first terminal 110 is provided with and runs a first client 111, and the first client 111 is an application program with a multi-user live streaming function. In the case that a first user 112 opens a multi-user live streaming room, the first user 112 is a live streamer of a first live streaming room, and the first terminal 110 displays a live streaming interface of the first live streaming room. In response to the first live streaming room satisfying a live streaming room consolidation condition, the first terminal 110 displays a consolidation selection list for the first user 112 to select a second client 131 that the first user wants to invite to join the first live streaming room. In response to receiving a select operation on the target client, the first terminal 110 sends a live streaming room consolidation request to the second terminal 130 via the server 120. In the case that the second terminal 130 accepts the live streaming room consolidation request, the first terminal 110 displays the target client in the live streaming interface of the first live streaming room.

The first terminal 110 is connected with the server 120 through a wireless network or a wired network.

The server 120 includes a memory 121, a processor 122, a user account database 123, a multi-user live streaming module 124, and a user-oriented input/output interface (I/O Interface) 125. The processor 122 is configured to load an instruction stored in the live streaming server 120, and process data in the user account database 123 and the multi-user live streaming module 124. The user account database 123 is configured to store data of user accounts used by the first terminal 110, the second terminal 130, and other terminals, such as avatars of the user accounts, user names of the user accounts, and live streaming room identifications corresponding to the user accounts. The multi-user live streaming module 124 is configured to receive a live streaming consolidation request sent by the first terminal 110, transmit the live streaming consolidation request to the second terminal 130, and consolidate live streaming rooms according to a response result of the live streaming consolidation request sent by the second terminal 130. The user-oriented I/O interface 125 is configured to establish communication with the first terminal 110 and/or the second terminal 130 through a wireless network or a wired network to exchange data.

In an illustrative example, in response to receiving the live streaming room consolidation request sent by the first terminal 110, the server 120 transmits the live streaming room consolidation request to the target client, closes the live streaming room of the target client, and adds the target client to the first live streaming room in the case that the target client receives the live streaming room consolidation request.

The second terminal 130 is provided with and runs a second client 131, and the second client 131 is an application program with a multi-user live streaming function. In the case that a second user 132 opens a multi-user live streaming room, the second user 132 is a live streamer of a second live streaming room, and the second terminal 130 displays a live streaming interface of the second live streaming room. In response to receiving the live streaming room consolidation request sent by the first client 111 via the server 120, the second user 132 chooses to accept or reject the live streaming room consolidation request. In response to receiving the accept operation on the live streaming room consolidation request, the second terminal 130 sends an acceptance response of the consolidation request to the server 120, and then the server 120 closes the second live streaming room, and adds the second client 131 to the first live streaming room. In the case that the second client 131 is successfully added to the first live streaming room, the second terminal 130 closes the live streaming interface of the second live streaming room, and displays the live streaming interface of the first live streaming room.

The second terminal 130 is connected with the server 120 through a wireless network or a wired network.

FIG. 1 shows only two terminals, however, a plurality of other terminals that access the server 120 are present in different embodiments. Optionally, the device types of the first terminal 110 and the second terminal 130 are the same or different. The device types include at least one of a smart phone, a tablet computer, an e-book reader, an MP3 player, an MP4 player, a laptop portable computer, and a desktop computer. In some embodiments, the first terminal 110 also receives a live streaming room consolidation request sent by the second terminal 130 or other terminals through a server 120. In response to receiving the accept operation on the live streaming room consolidation request, the server 120 closes the first live streaming room, and adds the first client 111 to a live streaming room corresponding to the live streaming room consolidation request. The second terminal 130 also sends a live streaming room consolidation request to the first terminal 110 or other terminals through a server 120, and in the case that the first terminal 110 or other terminals accept the live streaming room consolidation request, a corresponding client is displayed in a live streaming interface of a second live streaming room.

In addition, the application program in the embodiments of the present disclosure is an application program that can be run independently, or the application program described above is a program component that is run dependent on other types of application programs/web pages. For example, the application program with the live streaming function described above is a live streaming function component that is run dependent on an application program such as a shopping type application, a social type application, a short video type application.

Figure 2:
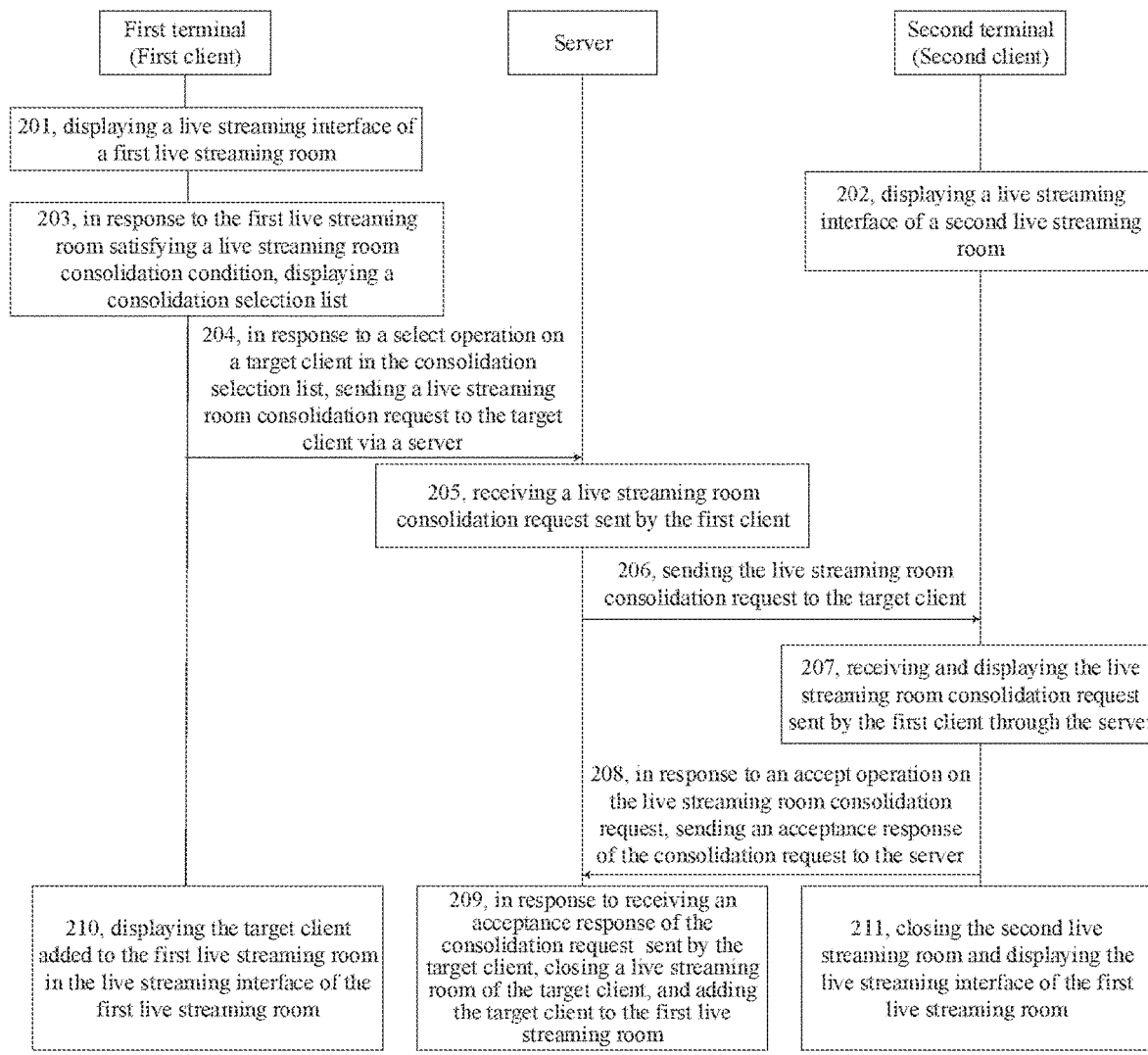
FIG. 2 is a flowchart of a multi-user live streaming method according to some embodiments of the present disclosure.

FIG. 2 shows a flowchart of a multi-user live streaming method according to some embodiments of the present disclosure. In the embodiment, the method applied to the first terminal 110, the server 120, and the second terminal 130 in the implementation environment shown in FIG. 1 is taken as an example for illustration, and the method includes the following steps.

In step 201, a first terminal displays a live streaming interface of a first live streaming room.

The first live streaming room is created by a first client, and is configured to allow the first client to communicate with other clients by audio or video. The first client is installed in the first terminal, and has a multi-user live streaming function.

In the case that the first client opens a multi-user live streaming room, the first terminal displays the live streaming interface of the first live streaming room, and the live streaming interface is configured to play a live streaming video or audio of a user corresponding to the first terminal. In some embodiments, the live streaming interface of the first live streaming room includes at least two playing regions. One of the playing regions is configured to play the live streaming video or audio of a live streamer (i.e., a user of the first terminal), and the other playing region is configured to play the live streaming videos or audios of guests. The live streamer sets the quantity of guests that are accommodated prior to opening the live streaming room. In the case that other users enter the first live streaming room through other clients, the client who is an audience client first plays the live streaming video or audio of the live streamer, these other users can also send live streaming participation requests to the first terminal through other terminals to apply for becoming guests. In response to the live streamer accepting the live streaming participation requests, these other users become guests of the first live streaming room, the live streaming videos or audios thereof are played through other playing region positions of the live streaming interface of the first live streaming room, and these other users perform audio and video communication with the live streamer.

In the embodiments of the present disclosure, users of the first client and other clients are referred to through user accounts. The live streamer, guest and audience are all users. The live streamer refers to the user who creates a live streaming room and initiates live streaming, the guest refers to the user who is invited to join the live streaming room by the live streamer, or the user who spontaneously applies for joining the live streaming room and acquires the authorization of the live streamer, and the audience refers to the user who watches the live streaming.

Figure 3:
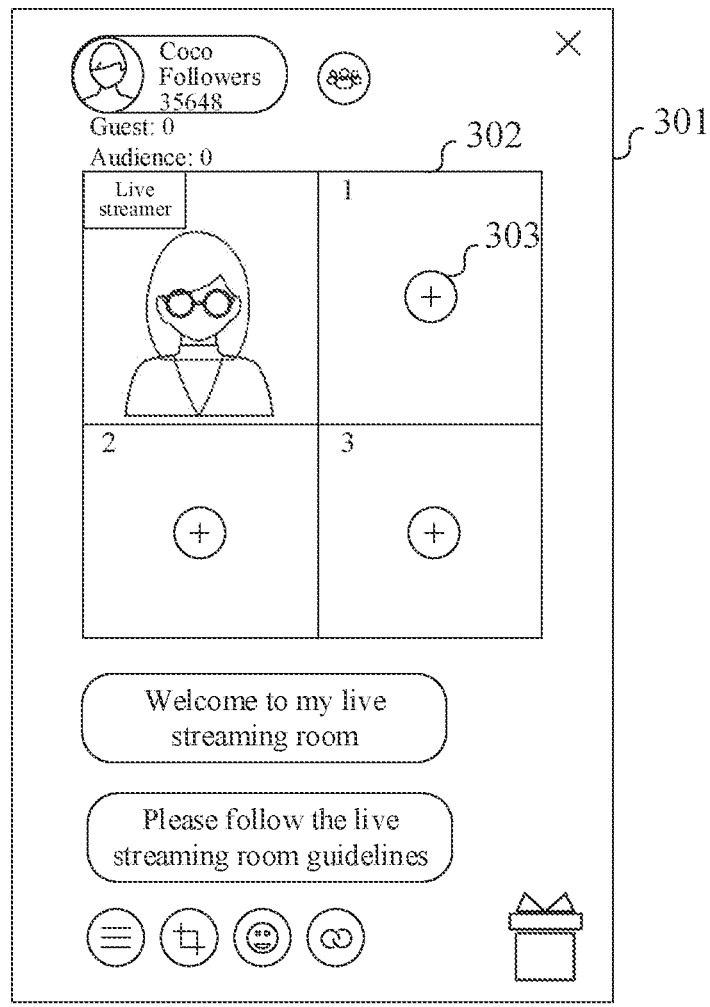
FIG. 3 is a schematic diagram of the live streaming interface of a first live streaming room according to some embodiments of the present disclosure.

Illustratively, as shown in FIG. 3, FIG. 3 shows a live streaming interface 301 of a first live streaming room. A playing region 302 in the live streaming interface 301 includes four parts, which are a live streamer position and three guest positions. The guest positions correspondingly display a live streaming participation control 303. The live streaming participation control 303 cannot be triggered in a first terminal and can be triggered in other terminals. The audience in the first live streaming room applies for becoming a guest in the first live streaming room by triggering the live streaming participation control 303. The live streaming interface 301 further displays a user identification of the live streamer "Coco", the quantity of guests and audiences of the first live streaming room at the current moment, and the like.

In step 202, a second terminal displays a live streaming interface of a second live streaming room.

The second live streaming room is created by a second client, and is configured to allow the second client to communicate with other clients by audio or video. The second client is installed in the second terminal, and is a client having a multi-user live streaming function. The first client and the second client are the same application program or are the same type of application program on different operating system platforms (such as Android or IOS). The first client and the second client are connected with the same server.

Similar to the first terminal, in the case that the second client opens a multi-user live streaming room, the second terminal displays the live streaming interface of the second live streaming room, and the live streaming interface is configured to play a live streaming video or audio of a user corresponding to the second terminal. Similarly, the live streaming interface of the second live streaming room includes at least two playing regions. One of the playing regions is configured to play the live streaming video or audio of a live streamer (i.e., a user of the second terminal), and the other playing region is configured to play the live streaming videos or audios of guests.

Figure 4:
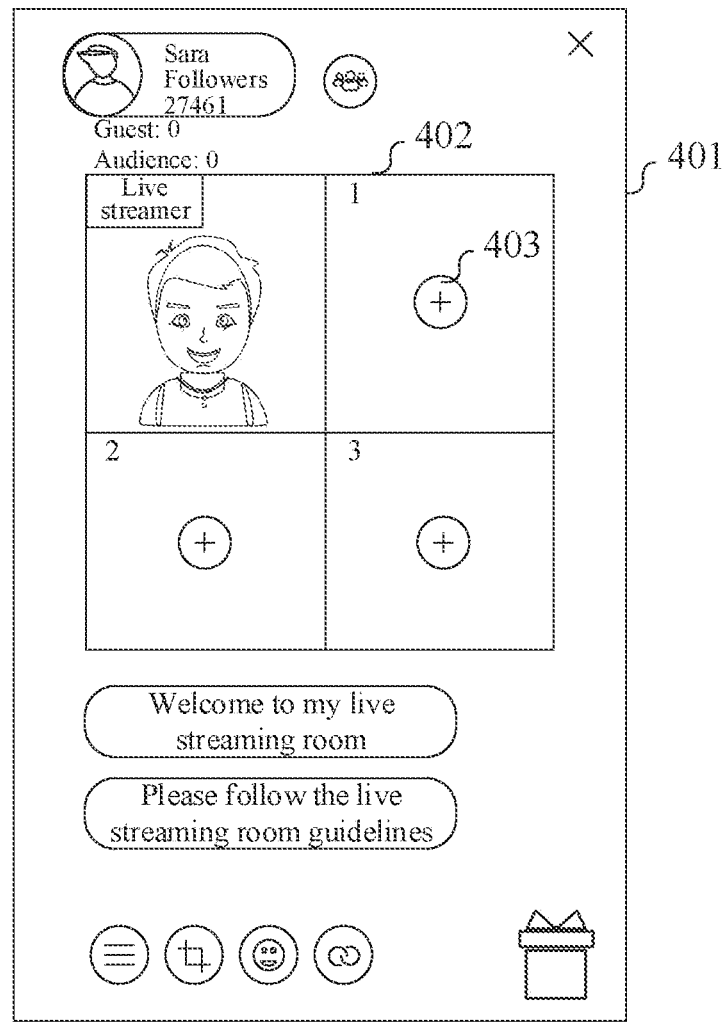
FIG. 4 is a schematic diagram of the live streaming interface of a second live streaming room according to some embodiments of the present disclosure.

Illustratively, as shown in FIG. 4, FIG. 4 shows a live streaming interface 401 of a second live streaming room. A playing region 402 in the live streaming interface 401 includes four parts, which are a live streamer position and three guest positions. The guest positions correspondingly display a live streaming participation control 403. The live streaming participation control 403 cannot be triggered in a second terminal and can be triggered in other terminals, and the audience in the second live streaming room applies to become a guest in the second live streaming room by triggering the live streaming participation control 403. The live streaming interface 401 further displays a user identification of the live streamer "Sara", the quantity of guests and audiences of the second live streaming room at the current moment, and the like.

The sequence of step 201 and step 202 is not strictly limited.

In step 203, in response to the first live streaming room satisfying a live streaming room consolidation condition, the first terminal displays a consolidation selection list.

The consolidation selection list includes a client identification of at least one second client. The second client creates a second live streaming room, and the second live streaming room satisfies the live streaming room consolidation condition. The second client refers to other clients which are performing live streaming except the first client.

The consolidation selection list includes the client identification of at least one second client. The live streamer of the first live streaming room selects any one second client or more second clients through the first terminal to perform live streaming room consolidation, or close the consolidation selection list in the case that the live streaming rooms do not need to be consolidated, and continue to perform the live streaming. In some embodiments, in response to the first live streaming room satisfying the live streaming room consolidation condition, the first terminal acquires a consolidation selection list from the server.

Optionally, in response to the first live streaming room satisfying the live streaming room consolidation condition, the first terminal automatically acquires and displays a consolidation selection list. Or in response to the first live streaming room satisfying the live streaming room consolidation condition, the first terminal prompts a user through a live streaming interface that the live streaming room consolidation can be performed and displays a live streaming room consolidation control. In response to receiving a trigger operation of the user on the live streaming room consolidation control, the first terminal displays a consolidation selection list. Alternatively, the user sets whether to automatically display the consolidation selection list. In response to the first live streaming room satisfying the live streaming room consolidation condition, the first terminal determines whether to automatically acquire and display the consolidation selection list based on the user setting, which is not limited in the embodiments of the present disclosure.

Optionally, the live streaming room consolidation condition is a live streaming room consolidation condition preset by the first client. For example, the live streaming room consolidation condition is that the total quantity of audiences and guests in the live streaming room is less than a threshold. Alternatively, the user automatically sets the live streaming room consolidation condition.

Figure 5:
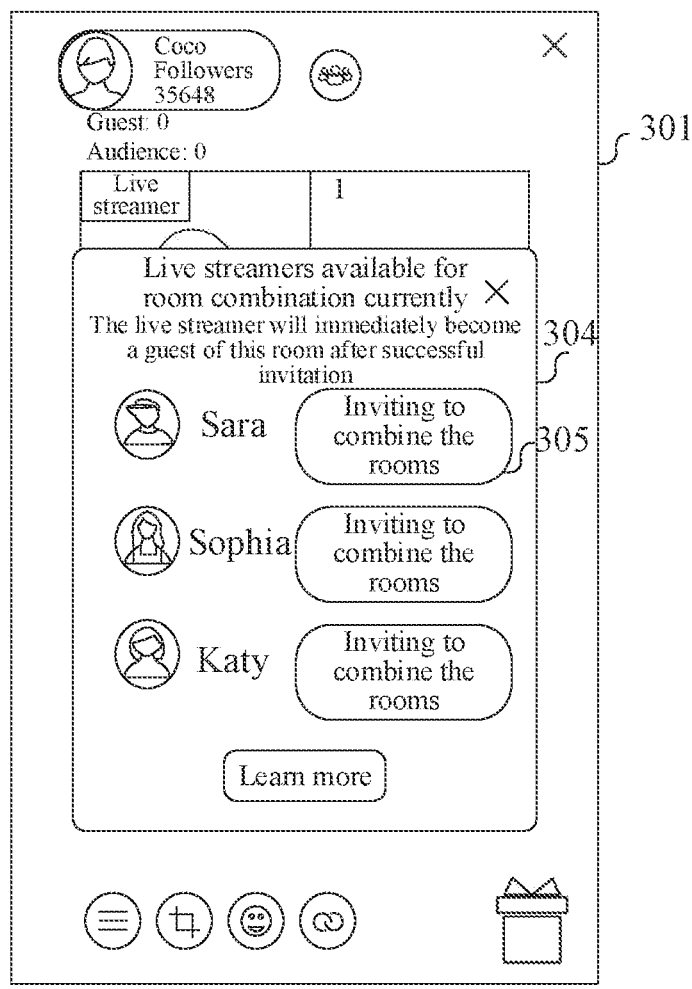
FIG. 5 is a schematic diagram of a consolidation selection list according to some embodiments of the present disclosure.

Illustratively, as shown in FIG. 5, FIG. 5 shows a consolidation selection list. The first terminal displays a prompt pop-up window 304 including a consolidation selection list on the top of the live streaming interface 301 of the first live streaming room. The prompt pop-up window 304 includes a text prompt of the live streaming room consolidation and client identifications of at least one second client (a user avatar and a user name corresponding to a second client) in the consolidation selection list, and each client identification corresponds to a trigger control 305.

In step 204, in response to a select operation on a target client in the consolidation selection list, the first terminal sends a live streaming room consolidation request to the target client through a server.

Optionally, in response to receiving a select operation on a certain second client, the first terminal determines the second client corresponding to the select operation as a target client, and automatically closes the consolidation selection list. Alternatively, the user sends a live streaming room consolidation request to a plurality of second terminals. The first terminal immediately sends the live streaming room consolidation request to the target client via the server in response to receiving the select operation on the target client, and closes the consolidation selection list in response to receiving the close operation on the consolidation selection list.

Illustratively, as shown in FIG. 5, in response to receiving a trigger operation on a trigger control 305 corresponding to a client identification "Sara", the first terminal determines that the client corresponding to "Sara" is a target client, and sends a live streaming room consolidation request to the client corresponding to "Sara" via the server.

In step 205, the server receives a live streaming room consolidation request sent by the first client.

The server receives a live streaming room consolidation request sent by the first client, and acquires a client identification of the first client and a client identification of the target client based on the live streaming room consolidation request, so as to transmit the live streaming room consolidation request to the target client.

In step 206, the server sends a live streaming room consolidation request to the target client.

Optionally, the server transmits the live streaming room consolidation request to the target client directly based on the client identification of the target client. Alternatively, the server generates a prompt message corresponding to the live streaming room consolidation request based on the client identification of the first client. The prompt message includes the client identification (a user avatar, a user name, and the like) of the first client, for example, "Coco invites you to consolidate the rooms", and sends the prompt message and the corresponding message type to the target client.

In step 207, a second terminal receives and displays the live streaming room consolidation request sent by the first client via the server.

In response to receiving the live streaming room consolidation request transmitted by the server, the target terminal displays the live streaming room consolidation request on the top of a live streaming interface of a second live streaming room through a notification pop-up window, and prompts a user corresponding to the second terminal that currently other users requesting to consolidate the live streaming rooms are present.

Figure 6:
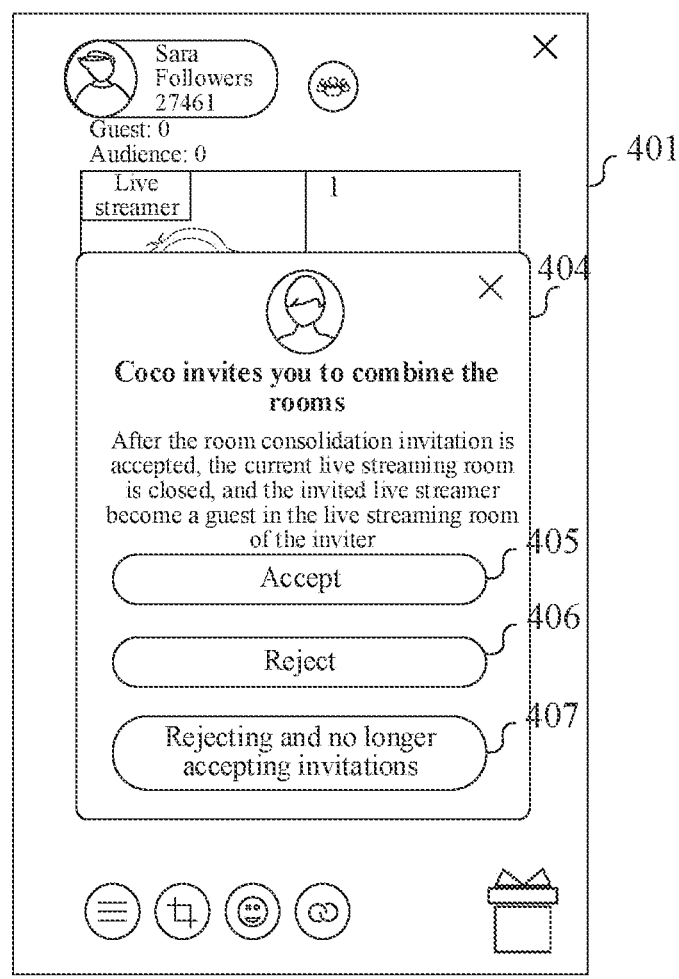
FIG. 6 is a schematic diagram of a live streaming room consolidation request according to some embodiments of the present disclosure.

Illustratively, referring to FIG. 6, FIG. 6 shows a live streaming room consolidation request. The second terminal displays a notification pop-up window 404 includes a live streaming room consolidation request on the top of a live streaming interface 401 of the second live streaming room. The live streaming room consolidation request includes a client identification of the first client and request content.

In step 208, in response to an accept operation on the live streaming room consolidation request, the second terminal sends an acceptance response of the consolidation request to the server.

The notification pop-up window corresponding to the live streaming room consolidation request includes an acceptance control. In response to receiving a trigger operation on the acceptance control, the second terminal determines that the accept operation on the live streaming room consolidation request is received, and sends an acceptance response of the consolidation request to the server.

In some embodiments, the notification pop-up window further includes a reject control, and the user triggers the reject control to enable the second terminal to send a consolidation request reject response to the server. Alternatively, in response to receiving a trigger operation on the reject control, the second terminal determines that the reject operation on the live streaming room consolidation request is received, directly closes the notification pop-up window, and does not send a response to the server. Alternatively, the user automatically sets whether to forbid consolidating the live streaming rooms, and the server determines whether to add a live streaming room to a consolidation selection list displayed by other clients in response to the live streaming room satisfying the live streaming room consolidation condition based on user data and whether to send the consolidation selection list to the live streaming room.

Illustratively, as shown in FIG. 6, the notification pop-up window 404 further includes an acceptance control 405, a first reject control 406, and a second reject control 407. In response to receiving the trigger operation on the acceptance control 405, the second terminal sends an acceptance response of the consolidation request to the server. In response to receiving the trigger operation on the first reject control 406, the second terminal sends a consolidation request rejection response to the server, or does not send any response and automatically closes the notification pop-up window 404. In response to receiving the trigger operation on the second reject control 407, the second terminal sends a consolidation request rejection response to the server, and notifies the server not to receive the live streaming room consolidation request before the second live streaming room is closed, such that the server does not add the second client to the consolidation selection list any more.

In step 209, in response to receiving an acceptance response of the consolidation request sent by a target client, a live streaming room of the target client is closed, and the target client is added to the first live streaming room by the server.

The acceptance response of the consolidation request indicates that the live streamer corresponding to the target client agrees to perform live streaming room consolidation, agrees to close the live streaming room of the target client, and joins the first live streaming room to become an audience or guest. The server closes the live streaming room of the target client in response to receiving the acceptance response of the consolidation request sent by the target client. In some embodiments, the server adds the target client to the first live streaming room, such that a user corresponding to the target client becomes an audience or guest in the first live streaming room.

Optionally, in response to receiving an acceptance response of the consolidation request sent by the target client, the server determines the current quantity of guests in the first live streaming room. In response to the current quantity of guests reaching the preset number of guests, that is, no free guest position is present in the first live streaming room, the server adds the target client to the audience in the first live streaming room, and enables the target client to wait for a guest position sequentially. That is, in the case that the free guest position is present, a user corresponding to the target client automatically becomes a guest in the first live streaming room to perform live streaming. Alternatively, in response to displaying the live streaming room consolidation requests, the second terminal displays a live streaming participation option, the user selects to join the first live streaming room as an audience or guest, and the server adds the target client to the first live streaming room according to the selection result sent by the second terminal, which is not limited in the embodiments of the present disclosure.

In step 210, the first terminal displays the target client added to the first live streaming room in the live streaming interface of the first live streaming room.

In the case that the target client is added to the first live streaming room as an audience client, the first terminal displays a client identification of the target client in an audience list of the live streaming interface of the first live streaming room. In the case that the target client is added to the first live streaming room as a guest client, the first terminal plays the live streaming video or audio of the target client in a playing region of a guest position in the live streaming interface of the first live streaming room.

Figure 7:
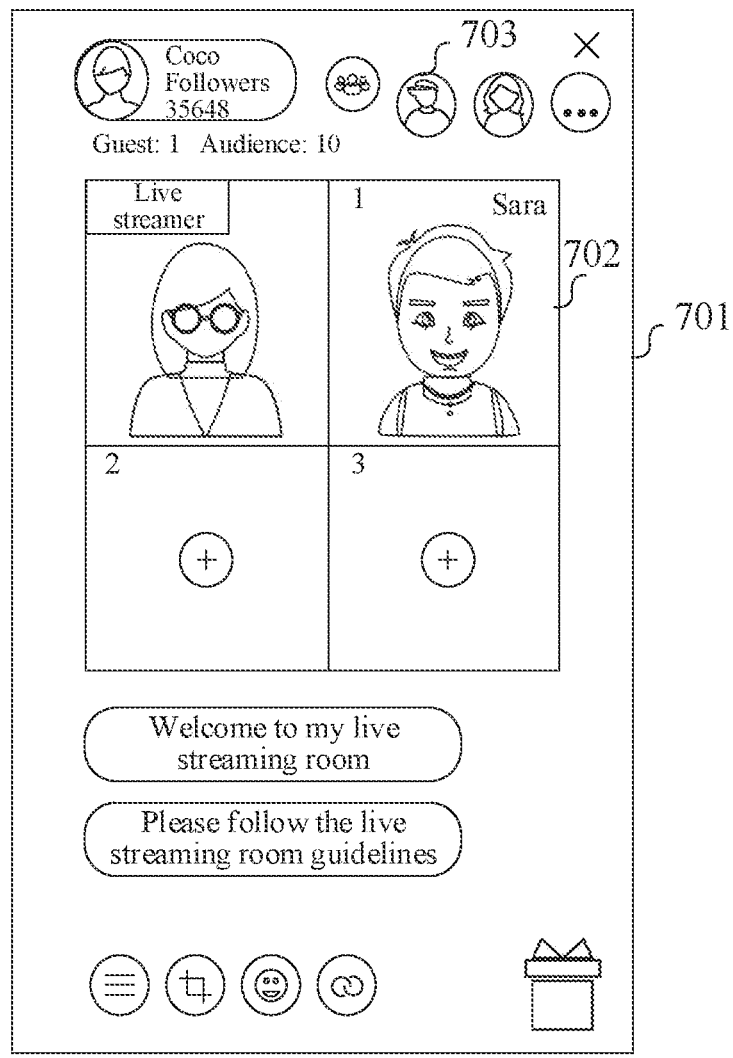
FIG. 7 is a schematic diagram of the live streaming interface of a first live streaming room with a target client added according to some embodiments of the present disclosure.

Illustratively, as shown in FIG. 7, FIG. 7 shows a live streaming interface of a first live streaming room in the case that a target terminal is added to the first live streaming room. Because a free guest position playing region 702 is present in the first live streaming room, the server directly transmits the live streaming video or audio of the target client to the client added to the first live streaming room, and the live streaming video or audio is played through the guest position playing region 702 in the live streaming interface 701 of the first live streaming room. A client identification 703 of the target client is displayed in the guest and audience list.

In step 211, the second terminal closes the second live streaming room and displays the live streaming interface of the first live streaming room.

In some embodiments, the live streaming interface of the first live streaming room displayed by the second terminal is the same as the live streaming interface displayed by the first terminal.

The sequence of step 210 and step 211 is not strictly limited.

In summary, in the embodiments of the present disclosure, the server consolidates live streaming rooms satisfying a live streaming room consolidation condition, a target client is added to a first live streaming room, and a second live streaming room created by the target client is closed, such that the engagement rate and the interaction rate of the first live streaming room are increased, and other users can be attracted to enter the first live streaming room, thereby preventing live streamers of both the first live streaming room and the second live streaming room from stopping using a multi-user live streaming function due to a relatively less quantity of users entering the two live streaming rooms. In addition, the second live streaming room is closed, such that the usage rate of the multi-user live streaming function is improved, and the data processing burden on the server can also be reduced, thereby avoiding the waste of resources.

Figure 8:
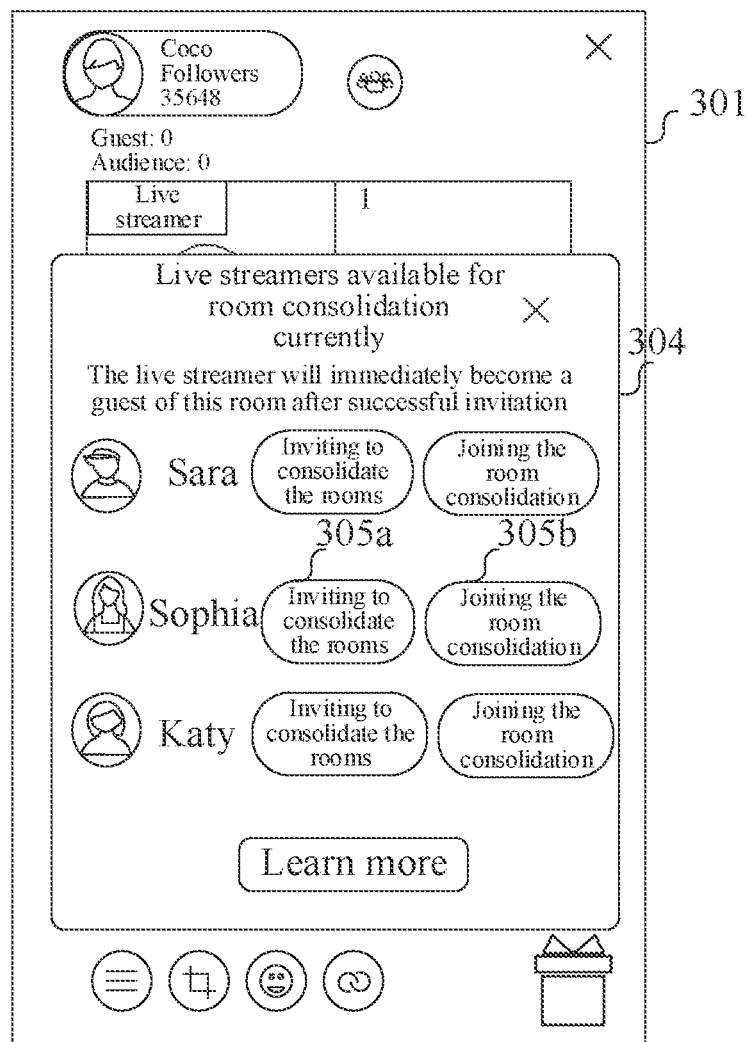
FIG. 8 is a schematic diagram of a consolidation selection list according to some embodiments of the present disclosure.

In order to facilitate the user to invite other users to join the live streaming room of the user or apply for joining other users' live streaming rooms, the consolidation selection list displayed by the first terminal includes an invite control and a join control. As shown in FIG. 8, a prompt pop-up window 304 of the consolidation selection list is displayed on the top of the live streaming interface 301 of the first live streaming room, wherein the prompt pop-up window 304 includes client identifications of at least one second client (a user avatar and a user name corresponding to a second client) in the consolidation selection list, and each of the client identifications corresponds to an invite control 305a and a join control 305b.

Figure 9:
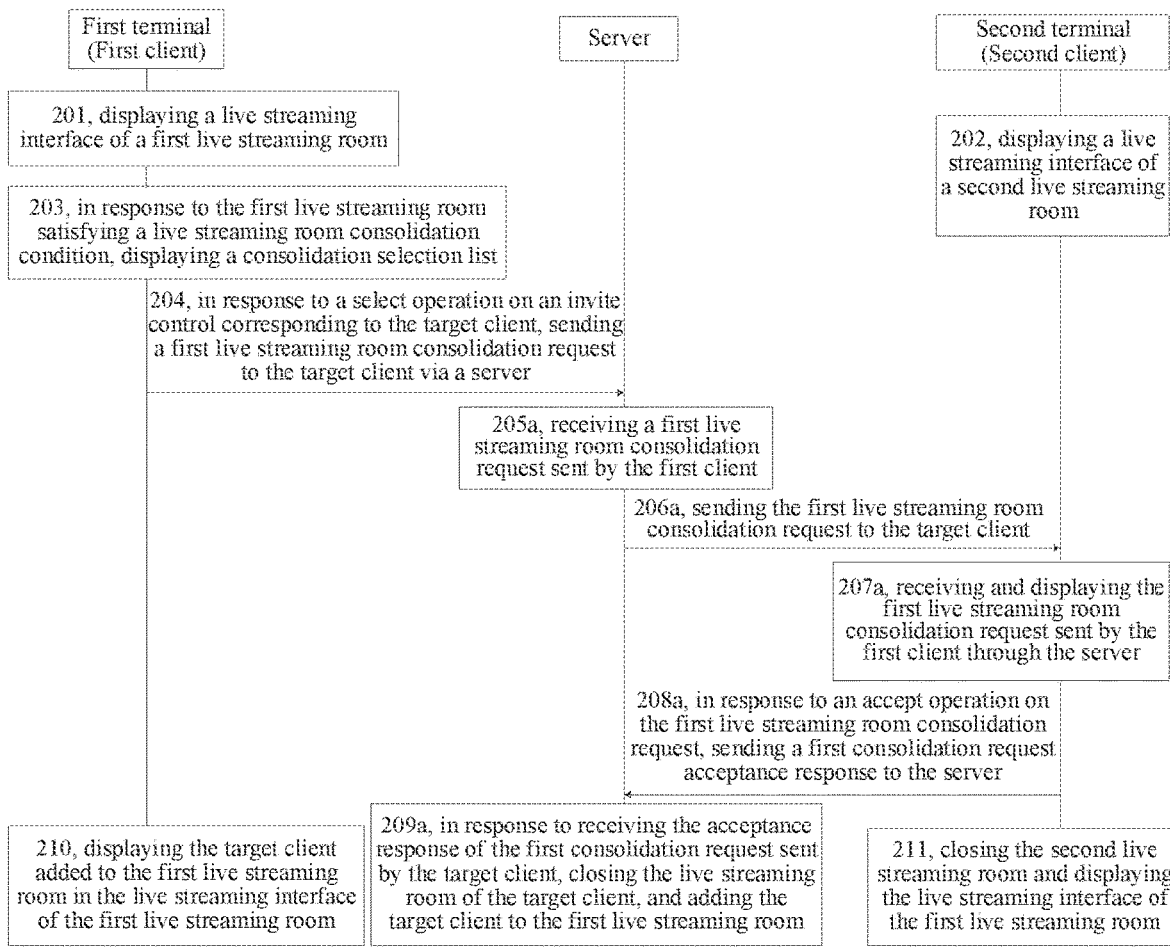
FIG. 9 is a flowchart of a multi-user live streaming method according to some embodiments of the present disclosure.

In some embodiments, based on FIG. 2, as shown in FIG. 9, the above steps 204 to 209 are replaced by steps 204a to 209a.

In step 204a, in response to the select operation on an invite control corresponding to the target client, the first terminal sends a first live streaming room consolidation request to the target client through a server.

The user invites a live streamer of the target client to join the first live streaming room by triggering the invite control corresponding to the target client. In some embodiments, in response to receiving a select operation on an invite control corresponding to a target client, a first terminal sends a first live streaming room consolidation request to the target client through a server. The first live streaming room consolidation request is configured to invite the target client to join a first live streaming room.

In step 205a, the server receives a first live streaming room consolidation request sent by the first client.

In step 206a, the server sends the first live streaming room consolidation request to the target client.

For specific embodiments of steps 205a and 206a, reference is made to the above steps 205 and 206, which are not repeated in the embodiments of the present disclosure.

In step 207a, a second terminal receives and displays the first live streaming room consolidation request sent by the first client via the server.

The second terminal displays a first live streaming room consolidation request sent by the first client via the server by a notification pop-up window, prompts a user corresponding to the second terminal that an invitation of a live streamer of the first live streaming room is received, and inquires whether to accept to join the first live streaming room.

In step 208a, in response to an accept operation on the first live streaming room consolidation request, the second terminal sends a first acceptance response of the consolidation request to the server.

In response to agreeing to close the second live streaming room and joining the first live streaming room, the user corresponding to the second terminal triggers an acceptance control corresponding to the first live streaming room consolidation request. In response to receiving a trigger operation on the acceptance control, the second terminal determines that the accept operation on the first live streaming room consolidation request is received and sends the first acceptance response of the consolidation request to the server. The first acceptance response of the consolidation request is configured to indicate that the server closes the second live streaming room, and adds the target client to the first live streaming room.

In step 209a, in response to receiving the first acceptance response of the consolidation request sent by the target client, the server closes the live streaming room of the target client, and adds the target client to the first live streaming room.

In some embodiments, step 209a includes step I, or steps II to IV.

In step I, in response to the quantity of clients having first identities in a first live streaming room not reaching a threshold, a server adds a target client to the first live streaming room, and sets the target client as a first identity.

The first identity has the authority of performing audio and video communication with a first client.

Illustratively, the client of the first identity is a guest client. Before the live streamer of the first live streaming room opens the live streaming room, the live streaming room mode is selected, that is, the threshold of the guest clients is selected, In response to the quantity of the guest clients in the first live streaming room not reaching the threshold in the case that the server adds the second terminal to the first live streaming room, the server adds the target clients to the first live streaming room, and the target clients are set as the guest clients.

In step II, in response to the quantity of clients having first identities in a first live streaming room not reaching a threshold, the server adds a target client to the first live streaming room and sets the target client as a second identity. The second identity does not have the authority of performing audio and video communication with a first client.

Optionally, in response to receiving an acceptance response of the consolidation request sent by the target client, the server determines the quantity of the clients having first identities in the first live streaming room. In response to the quantity of the current clients having first identities reaching a threshold, the server adds the target client to the first live streaming room and sets the target client as a second identity, such that the target client waits sequentially for being a client having a first identity. That is, in the case that the quantity of the clients having first identities is less than the threshold, a user corresponding to the target client automatically becomes the client having a first identity in the first live streaming room for live streaming. Or, in response to displaying the live streaming room consolidation request, the second terminal displays the live streaming participation option, the user selects to join the first live streaming room with the first identity or the second identity, and the server adds the target client to the first live streaming room according to a selection result sent by the second terminal.

In step III, identity setting priority is set for the target clients based on the adding moment of the target clients.

Because the live streamer of the first live streaming room invites the live streamers of at least two live streaming rooms, and before the user of the second terminal accepts the invitation, other users may actively join the live streaming room and apply for participating in the live streaming as the first identity, in the case that the second terminal sends an acceptance response of the consolidation request, the server acquires the quantity of clients applying for becoming the clients having first identities in the first live streaming room at this moment, thereby setting identity setting priority for the target clients.

Illustratively, in the case that the second terminal sends an acceptance response of the consolidation request, the server acquires that the quantity of clients with the first identities in the first live streaming room at this moment is 3, and the threshold is also 3. Before this moment, another second terminal that sends an acceptance response of the consolidation request is further present, the server sets identity setting priority for the target client as a second level, and a client corresponding to the second terminal that preferentially sends the acceptance response of the consolidation request is set as a first level.

In step IV, in response to the quantity of clients having first identities in a first live streaming room not reaching a threshold, the target client is set as a first identity based on the identity setting priority.

In response to the quantity of the clients having first identities in the first live streaming room not reaching a threshold, that is, in the case that a client having a first identity that exits the live streaming room or applies to become a client with a second identity is present, the server sets the target client as a first identity based on the identity setting priority at the moment.

For example, for the embodiments in step III described above, in the case that a client having a first identity that exits the live streaming room at a certain moment is present, the server sets the client with the first-level priority as the client having the first identity, transmits the live streaming audio or video of the client to a client added to the first live streaming room, and upgrades the priority of the target client to a first level. In the case that two clients having first identities that exit the live streaming room at a certain moment are present, the server sets the client and the target client with the first-level priority as clients having the first identities.

Figure 10:
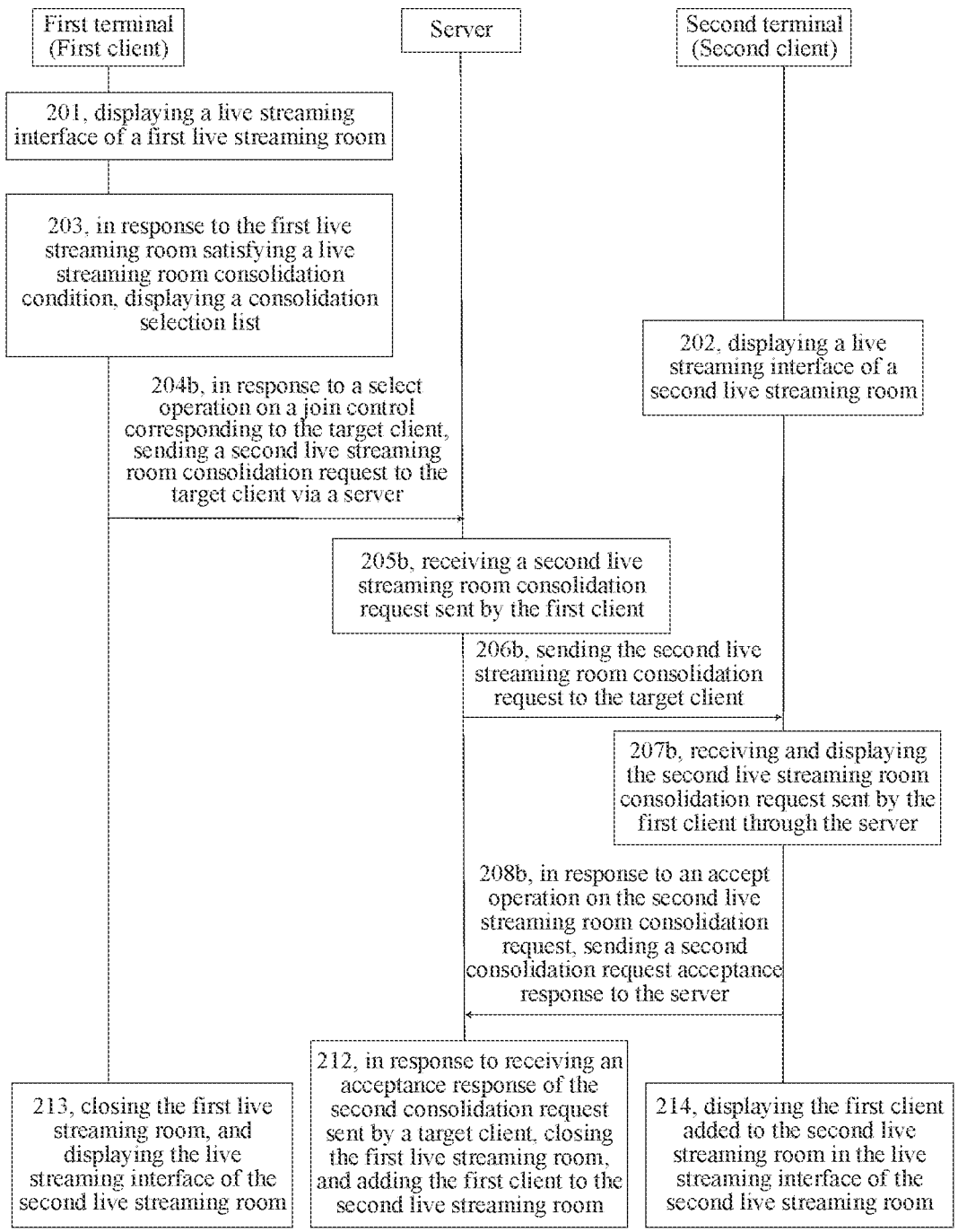
FIG. 10 is a flowchart of a multi-user live streaming method according to some embodiments of the present disclosure.

In some embodiments, based on FIG. 2, as shown in FIG. 10, the above steps 204 to 211 are replaced by steps 204b to 214.

In step 204b, in response to a select operation on a join control corresponding to the target client, a second live streaming room consolidation request is sent to the target client through a server.

The user applies to join the live streaming room of the target client by triggering the join control corresponding to the target client. In some embodiments, in response to receiving a select operation on a join control corresponding to a target client, a first terminal sends a second live streaming room consolidation request to the target client through a server. The second live streaming room consolidation request is configured to apply for joining the live streaming room of the target client.

In step 205b, a second live streaming room consolidation request sent by the first client is received.

In step 206b, the second live streaming room consolidation request is sent to the target client.

For specific embodiments of steps 205b and 206b, reference is made to the above steps 205 and 206, which are not repeated in the embodiments of the present disclosure.

In step 207b, a second terminal receives and displays the second live streaming room consolidation request sent by the first client via the server.

The second terminal displays the second live streaming room consolidation request sent by the first client via the server by a notification pop-up window, prompts a user corresponding to the second terminal that a joining application of a live streamer of the first live streaming room is received, and inquires whether to accept the first client to join the first live streaming room.

In step 208b, in response to an accept operation on the second live streaming room consolidation request, the second terminal sends a second acceptance response of the consolidation request to the server.

The second terminal displays the second live streaming room consolidation request, the corresponding accept control and reject control, and the like through the notification pop-up window. For example, the notification pop-up window displays the second live streaming room consolidation request "Coco requests to join your live streaming room", and displays controls labeled "accept" and "reject" below.

In response to agreeing the first client to join the second live streaming room, the user corresponding to the second terminal triggers an acceptance control corresponding to the second live streaming room consolidation request. In response to receiving a trigger operation on the acceptance control, the second terminal determines that the accept operation on the second live streaming room consolidation request is received and sends the second acceptance response of the consolidation request to the server. The second acceptance response of the consolidation request is configured to indicate that the server closes the first live streaming room, and adds the first client to the second live streaming room.

In some embodiments, a user sets whether to automatically consolidate the live streaming rooms. In the case that the user sets automatically consolidate the live streaming rooms, the second terminal automatically sends a second acceptance response of the consolidation request to the server in response to receiving the second live streaming room consolidation request, and the user does not need to perform control trigger operation.

In step 212, in response to receiving a second acceptance response of the consolidation request sent by a target client, the server closes a first live streaming room, and adds the first client to the second live streaming room.

The second live streaming room consolidation request indicates that the user corresponding to the first terminal agrees to close the first live streaming room and wants to join the target live streaming room, and the second acceptance response of the consolidation request indicates that the user corresponding to the second terminal agrees the first client to join the target live streaming room. Therefore, in response to receiving the second acceptance response of the consolidation request sent by the target client, the server closes the first live streaming room, and adds the first client to the second live streaming room, such that the user corresponding to the first client becomes an audience or guest in the target live streaming room.

In step 213, the first terminal closes the first live streaming room, and displays the live streaming interface of the second live streaming room.

In some embodiments, in the case that the server closes the first live streaming room and adds the first client to the second live streaming room, the server sends a live streaming room consolidation instruction to the first terminal. In response to receiving the live streaming room consolidation instruction, the first terminal closes the first live streaming room, and displays the live streaming interface of the second live streaming room.

In step 214, the second terminal displays the first client added to the second live streaming room in the live streaming interface of the second live streaming room.

In the case that the first client is added to the second live streaming room as a second identity, the second terminal displays a client identification of the first client in an audience list of the live streaming interface of the second live streaming room. In the case that the first client is added to the second live streaming room as a first identity, the second terminal plays the live streaming video or audio of the first client in a playing region of a guest position in the live streaming interface of the second live streaming room.

In the embodiments of the present disclosure, the invite control and the join control are set, such that a user conveniently selects to join the live streaming rooms of the target client or invite the target client to join a first live streaming room. The first terminal sends different live streaming room consolidation requests to the target client via the server based on the control triggered by the user, and consolidates the first live streaming room and the live streaming rooms of the target terminal based on the response of the target client to the different live streaming room consolidation requests, such that the diversity of the live streaming room consolidation is improved, and the success rate of the live streaming room consolidation is increased.

Figure 11:
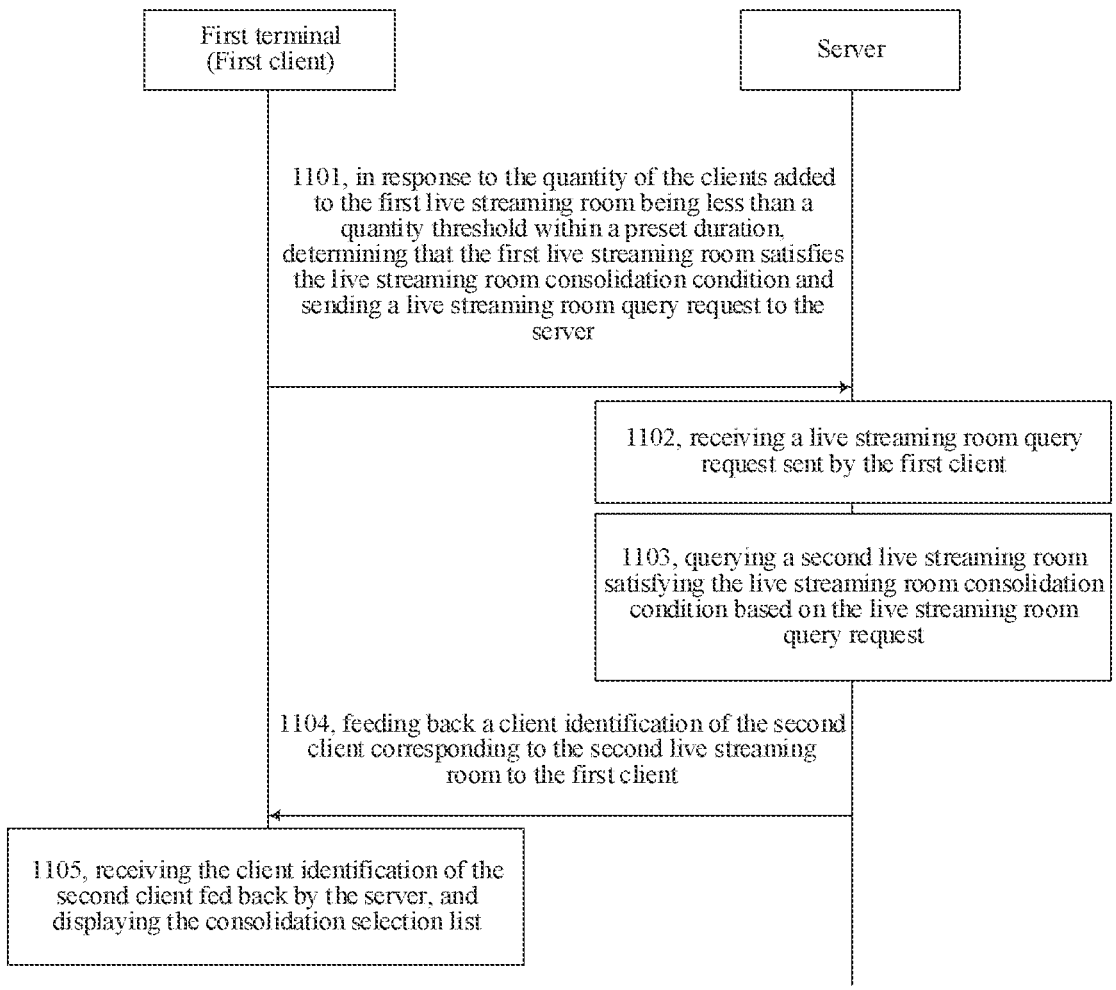
FIG. 11 is a flowchart of a multi-user live streaming method according to some embodiments of the present disclosure.

Because the second client also needs to satisfy the live streaming room consolidation condition, the first terminal needs to acquire the consolidation selection list via the server. In some embodiments, as shown in FIG. 11, the first terminal and the server cause the first client to display the consolidation selection list by performing steps 1101 to 1105.

In step 1101, in response to the quantity of the clients added to the first live streaming room being less than a quantity threshold within a preset duration, the first terminal determines that the first live streaming room satisfies the live streaming room consolidation condition, and sends a live streaming room query request to the server.

In some embodiments, the live streaming room consolidation condition is that the quantity of the clients added to the live streaming room within a preset duration is less than a quantity threshold. For example, the quantity of the clients added to the live streaming room within 3 consecutive minutes is less than 1, and in the case that the quantity of the clients added to the live streaming room at a certain moment is changed from 1 to 0, the first terminal starts timing from this moment. In the case that the first live streaming room satisfies the live streaming room consolidation condition, the first terminal immediately sends a live streaming room query request to the server for acquiring a consolidation selection list.

In step 1102, the server receives a live streaming room query request sent by the first client.

The server receives a live streaming room query request sent by the first client, acquires client information of the first client, and triggers and queries a second live streaming room.

In step 1103, the server queries a second live streaming room satisfying the live streaming room consolidation condition based on the live streaming room query request.

The second live streaming room also needs to satisfy the live streaming room consolidation condition. The quantity of the clients added to the live streaming room is likely to change at any time, and the second live streaming room satisfying the live streaming room consolidation condition is not constant all the time, such that the server needs to update the state of the live streaming room in real time, and distinguish the second live streaming room satisfying the live streaming room consolidation condition from other live streaming rooms by using a preset identification.

In some embodiments, upon step 1102, the server further needs to perform step one.

In step one, a preset identification is set for a first live streaming room. The preset identification is configured to indicate that the first live streaming room supports live streaming room consolidation.

In the case that a live streaming room query request sent by a first client is received, it is indicated that the first live streaming room satisfies the live streaming room consolidation condition. The first client is used as a second client to be added to a consolidation selection list relative to other clients satisfying the live streaming room consolidation condition, such that the server sets a preset identification for the first live streaming room for indicating that the first live streaming room supports live streaming room consolidation, and sends the first client being added to the consolidation selection list to the corresponding client in response to receiving the live streaming room query request sent by other clients.

The above step 1103 described above includes the step two.

In step two, a live streaming room containing the preset identification is determined as a second live streaming room.

The second live streaming room is a live streaming room satisfying the live streaming room consolidation condition, therefore the server determines the live streaming room containing the preset identification as the second live streaming room. In the case that no live streaming room containing the preset identification is present at the current moment, the server determines that a second live streaming room is not present, sends a query result to the first client, and prompts the user corresponding to the first client that the live streaming rooms cannot be consolidated currently, for example, "No live streaming room that is consolidated currently is present, please try again later".

In the case that the server sends the live streaming room consolidation request to the target client in step 206 of the embodiments described above, the server further needs to perform step three.

In step three, the preset identification corresponding to the first live streaming room is deleted.

In the case that the server receives the live streaming room consolidation request sent by the first client and sends the live streaming room consolidation request to a target client, it is indicated that a user corresponding to the first client has invited other users to join a first live streaming room or wants to apply for joining a second live streaming room, such that the user does not need to receive the live streaming room consolidation request sent by other clients. The server regards the first client as a client that has accepted the live streaming room consolidation request, and deletes the preset identification corresponding to the first live streaming room.

In step 1104, the server feeds back a client identification of the second client corresponding to the second live streaming room to the first client.

In the case that the quantity of the second live streaming rooms is relatively large, and all the second live streaming rooms are sent to the first client side, it is not convenient for a user to find the interested live streaming rooms. Therefore, in some embodiments, prior to determining the second live streaming rooms, the server acquires first client information of the first client and second client information of the clients corresponding to the second live streaming rooms, determines the priority of the second live streaming rooms according to the first client information and the second client information, sorts the second live streaming rooms in descending order of priority, adds the first n second live streaming rooms to the consolidation selection list, and send them to the first client, wherein n is a positive integer.

Optionally, the first client information includes at least one of a contact identification, first location information, a first language type, and first age information. The second client information includes at least one of a client identification, second location information, a second language type, and second age information. The server determines a second client whose client identification belongs to the contact identification as a first-level client, determines a second client whose second position information is matched with the first position information (for example, belonging to the same region range) as a second-level client, determines a second client whose second language type is the same as the first language type as a third-level client, and determines a second client whose second age information is matched with the first age information (e.g., the age difference is less than the age difference threshold) as a fourth-level client. The priority of the first-level client is higher than the priority of the second-level client, the priority of the second-level client is higher than the priority of the third-level client, and the priority of the third-level client is higher than the priority of the fourth-level client.

In step 1105, the first terminal receives the client identification of the second client fed back by the server and displays the consolidation selection list.

In some embodiments, in order to reduce the data processing burden of the server, in response to determining that a second client needs to be fed back to the first client, the server does not need to generate a consolidation selection list, and only needs to send a client identification of the second client to the first client. In response to receiving the client identification of the second client fed back by the server, the first terminal generates and displays a consolidation selection list based on the client identification of the second client.

In the embodiments of the present disclosure, the server updates the second live streaming rooms satisfying the live streaming room consolidation conditions in real time based on the conditions of the clients added to the live streaming rooms, and feeds back the client identifications of the second clients to the first client in response to receiving a live streaming room query request sent by the first client, such that the first terminal displays a consolidation selection list based on the received client identifications of the second clients. The server determines the priorities of the second clients based on the information of the first client and the second clients, and feeds back the second clients with high priorities to the first client preferentially, such that a user of the first client conveniently finds interested live streaming rooms quickly to perform consolidation, and the success rate of the live streaming room consolidation is improved.

Figure 12:
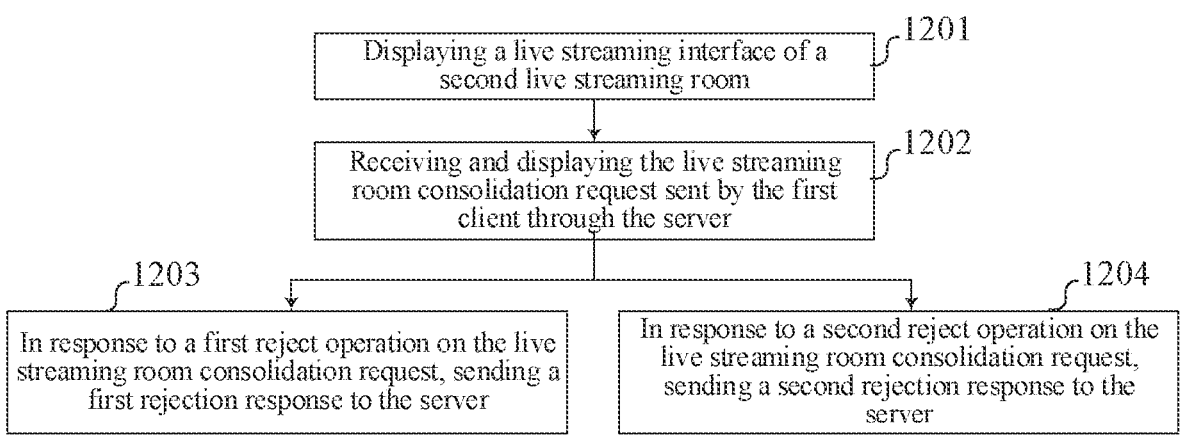
FIG. 12 is a flowchart of a multi-user live streaming method according to some embodiments of the present disclosure.

In some embodiments, in response to viewing the live streaming room consolidation request, a user corresponding to the second terminal selects to accept the live streaming room consolidation request or reject the live streaming room consolidation request. As shown in FIG. 12, in the multi-user live streaming method provided in the embodiments of the present disclosure, the second terminal needs to perform the following steps.

In step 1201, a live streaming interface of a second live streaming room is displayed.

In step 1202, the live streaming room consolidation request sent by the first client via the server is received and displayed.

For specific embodiments of steps 1201 and 1202, reference is made to steps 202 and 207, which are not repeated in the embodiments of the present disclosure.

In response to receiving a reject operation on the live streaming room consolidation request, the second terminal performs the following step 1203 or step 1204 based on an operation type of the reject operation.

In step 1203, in response to a first reject operation on the live streaming room consolidation request, a first rejection response is sent to the server.

In some embodiments, in response to displaying the live streaming room consolidation request, the second terminal further displays a first reject control corresponding to the live streaming room consolidation request. In the case that the user corresponding to the second terminal rejects to consolidate with the first live streaming room, and the user is possible to consolidate with other live streaming rooms, the first reject operation is triggered by triggering a first reject control corresponding to the live streaming room consolidation request, such that the second terminal sends the first rejection response to the server.

Correspondingly, in response to receiving the first rejection response sent by the target client, the server sends a reject consolidation instruction to the first client.

In step 1204, in response to a second reject operation on the live streaming room consolidation request, a second rejection response is sent to the server.

In some embodiments, in response to displaying the live streaming room consolidation request, the second terminal further displays a second reject control corresponding to the live streaming room consolidation request. In the case that the user corresponding to the second terminal rejects to consolidate with the first live streaming room and rejects to consolidate with any live streaming room except the first live streaming room, the second reject operation is triggered by triggering a second reject control corresponding to the live streaming room consolidation request, such that the second terminal sends the second rejection response to the server.

Correspondingly, in response to receiving the second rejection response sent by the target client, the server sends a reject consolidation instruction to the first client, and deletes the preset identification of the live streaming room corresponding to the target client.

As shown in FIG. 6, the notification pop-up window 404 includes a first reject control 406 and a second reject control 407. In response to receiving a trigger operation on the first reject control 406, the second terminal sends a first rejection response to the server. In response to receiving a trigger operation on the second reject control 407, the second terminal sends a second rejection response to the server, and notifies the server that the live streaming room consolidation request is not received before the second live streaming room is closed, such that the server deletes the preset identification of the second live streaming room.

In the embodiments of the present disclosure, the second terminal sends the corresponding rejection response to the server according to the operation type of the received reject operation, such that the server sends the reject consolidation instruction to the first client, and in response to receiving a second rejection response sent by the target client, the server deletes the preset identification of the live streaming room corresponding to the target client, such that different requirements of a user on consolidating the live streaming rooms can be met, avoiding that the user corresponding to the target client is interfered by the live streaming consolidation request during the live streaming, thereby affecting the live streaming.

Figure 13:
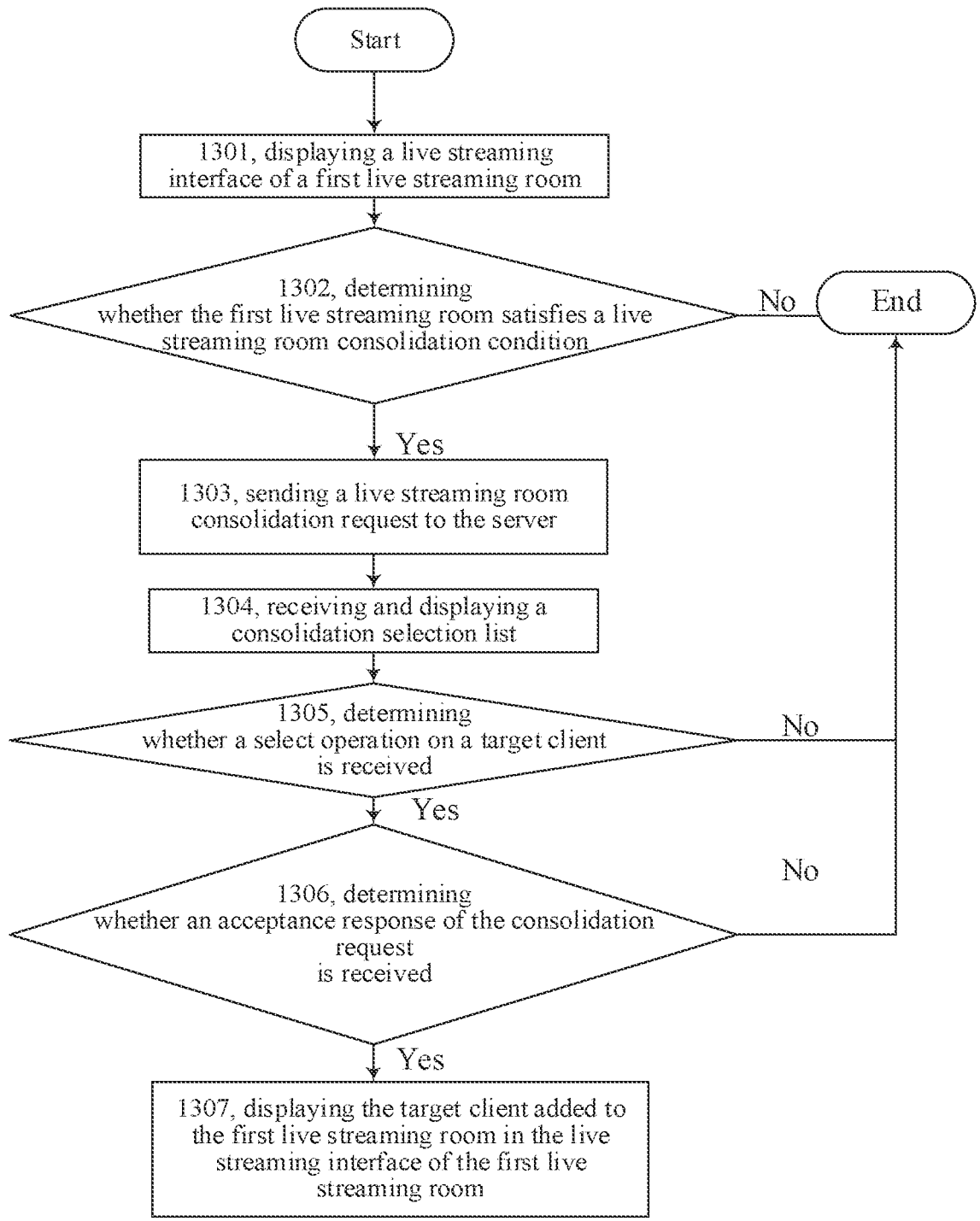
FIG. 13 is a flowchart of a multi-user live streaming method according to some embodiments of the present disclosure.

In consolidation with the above embodiments, in an illustrative example, in the case that the current terminal is a first terminal, the process of live streaming with multiple users is shown in FIG. 13.

In step 1301, a live streaming interface of a first live streaming room is displayed.

In step 1302, whether the first live streaming room satisfies a live streaming room consolidation condition is determined. If so, step 1303 is performed, otherwise, the process is ended.

In step 1303, a live streaming room consolidation request is sent to the server.

In step 1304, a consolidation selection list is received and displayed.

In step 1305, whether a select operation on a target client is received is determined. If so, step 1306 is performed, otherwise, the process is ended.

In step 1306, whether the acceptance response of the consolidation request is received is determined. If so, step 1307 is performed, otherwise, the process is ended.

In step 1307, displaying the target client added to the first live streaming room in the live streaming interface of the first live streaming room.

Figure 14:
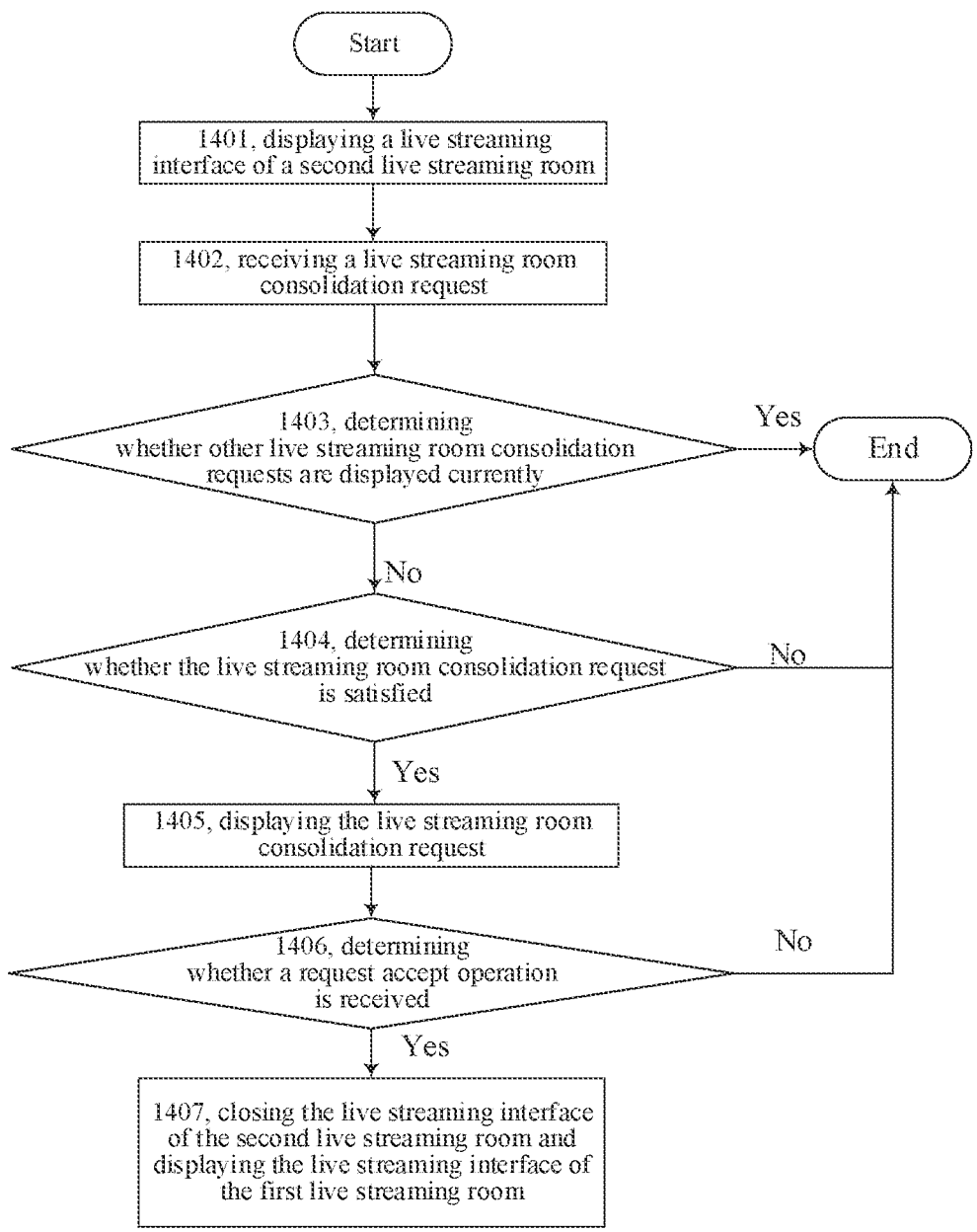
FIG. 14 is a flowchart of a multi-user live streaming method according to some embodiments of the present disclosure.

In consolidation with the above embodiments, in an illustrative example, in the case that the current terminal is a second terminal, the process of the multi-user live streaming is shown in FIG. 14.

In step 1401, a live streaming interface of a second live streaming room is displayed.

In step 1402, a live streaming room consolidation request is received.

In step 1403, whether other live streaming room consolidation requests are displayed currently is determined. If so, the process is ended, otherwise, step 1404 is performed.

In step 1404, whether the live streaming room consolidation request is satisfied is determined. If so, step 1405 is performed, otherwise, the process is ended.

In step 1405, the live streaming room consolidation request is displayed.

In step 1406, whether a request accept operation is received is determined. If so, step 1407 is performed, otherwise, the process is ended.

In step 1407, the live streaming interface of the second live streaming room is closed and the live streaming interface of the first live streaming room is displayed.

In the above embodiments, the step that with the first terminal as the execution subject can be separately implemented is called a first terminal side multi-user live streaming method. The step that with the second terminal as the execution subject can be separately implemented is called a second terminal side multi-user live streaming method. The step that with the server as the execution subject can be separately implemented is called a server side multi-user live streaming method, which are not repeated in the embodiments.

Figure 15:
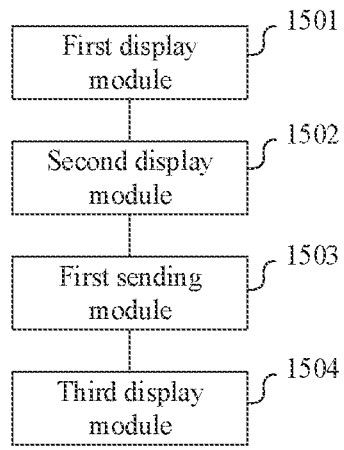
FIG. 15 is a structural block diagram of a multi-user live streaming apparatus according to some embodiments of the present disclosure.

FIG. 15 is a structural block diagram of a multi-user live streaming apparatus according to some embodiments of the present disclosure. The apparatus includes:

a first display module 1501, configured to display a live streaming interface of a first live streaming room, wherein the first live streaming room is created by a first client and is configured to allow the first client to communicate with other clients by audio or video;

a second display module 1502, configured to display, in response to the first live streaming room satisfying a live streaming room consolidation condition, a consolidation selection list, wherein the consolidation selection list includes a client identification of at least one second client, the second client creates a second live streaming room, and the second live streaming room satisfies the live streaming room consolidation condition;

a first sending module 1503, configured to send, in response to a select operation on a target client in the consolidation selection list, a live streaming room consolidation request to the target client through a server, wherein the server is configured to close a live streaming room created by the target client in response to receiving an acceptance response of the consolidation request sent by the target client, and add the target client to the first live streaming room; and a third display module 1504, configured to display, in the live streaming interface of the first live streaming room, the target client added to the first live streaming room.

Optionally, the consolidation selection list includes an invite control.

The first sending module 1503 includes:

a first sending unit, configured to send, in response to a select operation on the invite control corresponding to the target client, a first live streaming room consolidation request to the target client via the server, wherein the first live streaming room consolidation request is configured to invite the target client to join the first live streaming room.

Optionally, the consolidation selection list further includes a join control.

The first sending module 1503 includes:

a second sending unit, configured to send, in response to a select operation on the join control corresponding to the target client, a second live streaming room consolidation request to the target client via the server, wherein the second live streaming room consolidation request is configured to request to join a live streaming room created by the target client.

The apparatus further includes:

a seventh display module, configured to close the first live streaming room, and display a live streaming interface of a second live streaming room, wherein the second live streaming room is created by the target client.

Optionally, the second display module 1502 includes:

a third sending unit, configured to determine, in response to the quantity of clients added to the first live streaming room being less than a quantity threshold within a preset duration, that the first live streaming room satisfies the live streaming room consolidation condition, and send a live streaming room query request to the server, wherein the server is configured to query the second live streaming room satisfying the live streaming room consolidation condition based on the live streaming room query request, and feed back a client identification of the second client corresponding to the second live streaming room; and a first receiving unit, configured to receive the client identification of the second client fed back by the server, and display the consolidation selection list.

Figure 16:
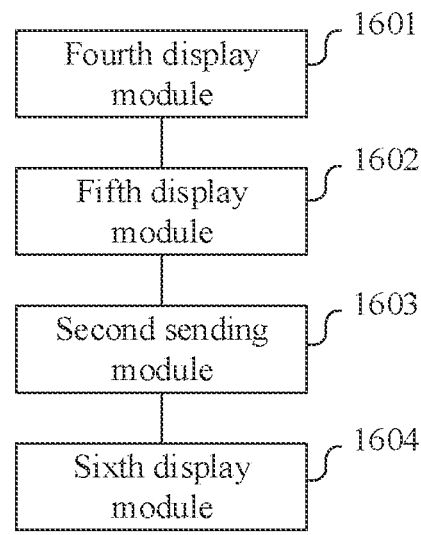
FIG. 16 is a structural block diagram of a multi-user live streaming apparatus according to some embodiments of the present disclosure.

FIG. 16 is a structural block diagram of a multi-user live streaming apparatus according to some embodiments of the present disclosure, wherein the apparatus includes:

a fourth display module 1601, configured to display a live streaming interface of a second live streaming room, wherein the second live streaming room is created by a second client and is configured to allow the second client to communicate with other clients by audio or video;

a fifth display module 1602, configured to receive and display a live streaming room consolidation request sent by a first client through a server, wherein the live streaming room consolidation request is generated by the first client in response to receiving a select operation on the second client in a consolidation selection list;

a second sending module 1603, configured to send, in response to an accept operation on the live streaming room consolidation request, an acceptance response of the consolidation request to the server, wherein the server is configured to add the second client to a first live streaming room in response to receiving the acceptance response of the consolidation request, and the first live streaming room is created by the first client; and a sixth display module 1604, configured to close the second live streaming room and display a live streaming interface of the first live streaming room.

Optionally, the live streaming room consolidation request includes a first live streaming room consolidation request. The first live streaming room consolidation request is sent by the first client in response to receiving a select operation on an invite control corresponding to the second client in the consolidation selection list.

The fifth display module 1602 includes:
a first display unit, configured to receive and display the first live streaming room consolidation request sent by the first client via the server.

The second sending module 1603 includes:
a fourth sending unit, configured to send, in response to an accept operation on the first live streaming room consolidation request, a first acceptance response of the consolidation request to the server, wherein the first acceptance response of the consolidation request is configured to indicate that the server closes the second live streaming room, and adds the second client to the first live streaming room.

Optionally, the live streaming room consolidation request further includes a second live streaming room consolidation request, and the second live streaming room consolidation request is sent by the first client in response to receiving a select operation on a join control corresponding to the second client in the consolidation selection list.

The fifth display module 1602 includes:
a second display unit, configured to receive and display the second live streaming room consolidation request sent by the first client via the server.

The second sending module 1603 includes:
a fifth sending unit, configured to send, in response to an accept operation on the second live streaming room consolidation request, a second acceptance response of the consolidation request to the server, wherein the second acceptance response of the consolidation request is configured to indicate that the server closes the first live streaming room, and adds the first client to the second live streaming room; and The apparatus further includes:
an eighth display module, configured to display, in a live streaming interface of the second live streaming room, the first client added to the second live streaming room.

Optionally, the apparatus further includes:
a fourth sending module, configured to send, in response to a first reject operation on the live streaming room consolidation request, a first rejection response to the server, wherein the server is configured to send a reject consolidation instruction to the first client; and a fifth sending module, configured to send, in response to a second reject operation on the live streaming room consolidation request, a second rejection response to the server, wherein the server is configured to send a reject consolidation instruction to the first client, and delete a preset identification corresponding to the second client side, and the preset identification is configured to indicate that the live streaming room satisfies the live streaming room consolidation condition.

Figure 17:
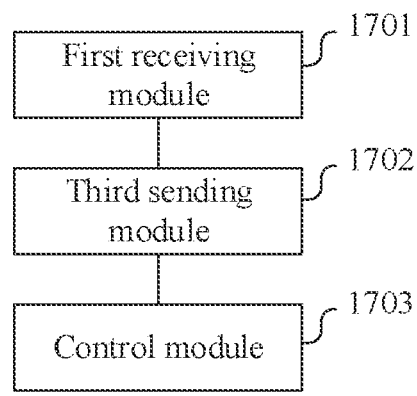
FIG. 17 is a structural block diagram of a multi-user live streaming apparatus according to some embodiments of the present disclosure.

FIG. 17 is a structural block diagram of a multi-user live streaming apparatus according to some embodiments of the present disclosure. The apparatus includes:

a first receiving module 1701, configured to receive a live streaming room consolidation request sent by a first client, wherein the live streaming room consolidation request is generated by the first client in response to receiving a select operation on a target client in a consolidation selection list, the consolidation selection list is displayed in the case that a first live streaming room created by the first client satisfies a live streaming room consolidation condition, the consolidation selection list includes a client identification of at least one second client, the second client creates a second live streaming room, and the second live streaming room satisfies the live streaming room consolidation condition;

a third sending module 1702, configured to send the live streaming room consolidation request to the target client; and a control module 1703, in response to receiving an acceptance response of the consolidation request sent by the target client, configured to close a live streaming room of the target client, and add the target client to the first live streaming room.

Optionally, the apparatus further includes:
a second receiving module, configured to receive a live streaming room query request sent by the first client, wherein the live streaming room query request is sent in response to the first live streaming room satisfying the live streaming room consolidation condition;

a query module, configured to query the second live streaming room satisfying the live streaming room consolidation condition based on the live streaming room query request; and a sixth sending module, configured to feed back a client identification of the second client corresponding to the second live streaming room to the first client, wherein the first client is configured to display the consolidation selection list based on the client identification of the second client.

Optionally, the apparatus further includes:

a setting module, configured to set a preset identification for the first live streaming room, wherein the preset identification is configured to indicate that the first live streaming room supports live streaming room consolidation.

The query module includes:

a determining unit, is configured to determine a live streaming room containing the preset identification as the second live streaming room.

The apparatus further includes:

a deleting unit, configured to delete the preset identification corresponding to the first live streaming room.

Optionally, the apparatus further includes:

a seventh sending module, configured to send, in response to receiving a first rejection response sent by the target client, a reject consolidation instruction to the first client; and an eighth sending module, in response to receiving a second rejection response sent by the target client, configured to send a reject consolidation instruction to the first client, and delete the preset identification of the live streaming room corresponding to the target client.

Optionally, the control module 1703 includes:

a first control unit, in response to the quantity of clients having first identities in the first live streaming room not reaching a threshold, configured to add the target client to the first live streaming room, and set the target client as a first identity; and a second control unit, in response to the quantity of clients having first identities in the first live streaming room reaching a threshold, configured to add the target client to the first live streaming room, and set the target client as a second identity, and set identity setting priority for the target client based on the adding moment of the target client, and in response to the quantity of clients having first identities in the first live streaming room not reaching a threshold, set the target client as the first identity based on the identity setting priority.

The first identity has the authority of performing audio and video communication with the first client, and the second identity does not have the authority of performing audio and video communication with the first client.

In summary, in the embodiments of the present disclosure, the server consolidates live streaming rooms satisfying a live streaming room consolidation condition, a target client is added to a first live streaming room, and a second live streaming room created by the target client is closed, such that the engagement rate and the interaction rate of the first live streaming room are increased, and other users can be attracted to enter the first live streaming room, thereby preventing live streamers of both the first live streaming room and the second live streaming room from stopping using a multi-user live streaming function due to a relatively less quantity of users entering the two live streaming rooms. In addition, the second live streaming room is closed, such that the usage rate of the multi-user live streaming function is improved, and the data processing burden on the server can also be reduced, thereby avoiding the waste of resources.

In some embodiments, a terminal is further provided. The terminal includes a processor and a memory. The memory stores at least one instruction, at least one program, a code set, or an instruction set. The processor, when loading and executing the at least one instruction, the at least one program, the code set, or the instruction set, is caused to implement the multi-user live streaming method performed by the terminal according to the above embodiments.

In some embodiments, a server is further provided, wherein the server includes a processor and a memory. The memory stores at least one instruction, at least one program, a code set, or an instruction set. The processor, when loading and executing the at least one instruction, the at least one program, the code set, or the instruction set, is caused to implement the multi-user live streaming method performed by the server according to the above embodiments.

The embodiments of the present disclosure further provide a non-volatile computer readable storage medium, wherein the non-volatile computer readable storage medium stores at least one instruction. A processor, when loading and executing the at least one instruction, is caused to implement the multi-user live streaming method according to the above embodiments.

According to one aspect of the present disclosure, a computer program product or a computer program is provided. The computer program product or the computer program includes computer instructions stored in a computer readable storage medium. A processor of a terminal reads the computer instructions from the computer readable storage medium, and executes the computer instructions to cause the terminal to perform the multi-user live streaming method provided in various alternative implementations according to the above aspect.

Those skilled in the art should be appreciated that in one or more of the above embodiments, the functions described in the embodiments of the present disclosure is implemented in hardware, software, firmware, or any consolidation thereof. The functions, when implemented in software, is stored in a computer readable storage medium or transmitted as one or more instructions or codes on a computer readable storage medium. The computer readable storage medium includes a computer storage medium and a communication medium, wherein the communication medium includes any medium that facilitates transfer of a computer program. The storage medium is any available medium that is accessible by a general purpose or special purpose computer.

Described above are merely optional embodiments of the present disclosure and are not intended to limit the present disclosure. Any modifications, equivalents, improvements, and the like, made within the spirit and principle of the present disclosure should fall within the protection scope of the present disclosure.

What is claimed is:

1. A multi-user live streaming method, applicable to a terminal, the method comprising:

displaying a live streaming interface of a first live streaming room, wherein the first live streaming room is created by a first client and is configured to allow the first client to communicate with other clients by audio or video;

displaying, in response to the first live streaming room satisfying a live streaming room consolidation condition, a consolidation selection list, wherein the consolidation selection list comprises a client identification of at least one second client, the second client creates a second live streaming room, and the second live streaming room satisfies the live streaming room consolidation condition, wherein the live streaming room consolidation condition is a condition that a quantity of audiences and guests in the first live streaming room is less than a threshold within a preset duration;

sending, in response to a select operation on a target client in the consolidation selection list, a live streaming room consolidation request to the target client via a server, wherein the server is configured to close a live streaming room created by the target client in response to receiving an acceptance response of the consolidation request from the target client, and add the target client to the first live streaming room, and in response to the target client displaying the live streaming room consolidation request, a live streaming participation option is displayed on the target client, such that the target client selects to join the first live streaming room as an audience or guest; and displaying, in the live streaming interface of the first live streaming room, the target client added to the first live streaming room.

2. The method according to claim 1, wherein
the consolidation selection list comprises an invite control; and
sending, in response to the select operation on the target client in the consolidation selection list, the live streaming room consolidation request to the target client via the server comprises:
sending, in response to the select operation on the invite control corresponding to the target client, a first live streaming room consolidation request to the target client via the server, wherein the first live streaming room consolidation request is configured to invite the target client to join the first live streaming room.

3. The method according to claim 2, wherein
the consolidation selection list further comprises a join control;
sending, in response to the select operation on the target client in the consolidation selection list, the live streaming room consolidation request to the target client via the server comprises:
sending, in response to the select operation on the join control corresponding to the target client, a second live streaming room consolidation request to the target client via the server, wherein the second live streaming room consolidation request is configured to request to join a live streaming room created by the target client; and
the method further comprises:
closing the first live streaming room, and displaying a live streaming interface of a second live streaming room, wherein the second live streaming room is created by the target client.

4. The method according to claim 1, wherein displaying, in response to the first live streaming room satisfying the live streaming room consolidation condition, the consolidation selection list comprises:
sending a live streaming room query request to the server, wherein the server is configured to query, based on the live streaming room query request, the second live streaming room satisfying the live streaming room consolidation condition, and feed back a client identification of the second client corresponding to the second live streaming room; and
receiving the client identification of the second client fed back by the server, and displaying the consolidation selection list.

5. A multi-user live streaming method, applicable to a terminal, the method comprising:
displaying a live streaming interface of a second live streaming room, wherein the second live streaming room is created by a second client and is configured to allow the second client to communicate with other clients by audio and video;
receiving and displaying a live streaming room consolidation request from a first client via a server, wherein the live streaming room consolidation request is generated by the first client in response to receiving a select operation on the second client in a consolidation selection list, in response to displaying the live streaming room consolidation request, a live streaming participation option is displayed, such that the second client selects to join a first live streaming room as an audience or quest, and wherein a consolidation selection list comprising a client identification of the second client is displayed on the first client in response to the first live streaming room satisfying a live streaming room consolidation condition which is a condition that a quantity of clients joining the first live streaming room being less than a quantity threshold within a preset duration;
sending, in response to an accept operation on the live streaming room consolidation request, an acceptance response of the consolidation request to the server, wherein the server is configured to add the second client to the first live streaming room in response to receiving the acceptance response of the consolidation request, and the first live streaming room is created by the first client; and
closing the second live streaming room, and displaying a live streaming interface of the first live streaming room.

6. The method according to claim 5, wherein
the live streaming room consolidation request comprises a first live streaming room consolidation request, and the first live streaming room consolidation request is sent by the first client in response to receiving the select operation on an invite control corresponding to the second client in the consolidation selection list;
receiving and displaying the live streaming room consolidation request from the first client via the server comprises:
receiving and displaying the first live streaming room consolidation request from the first client via the server; and
sending, in response to the accept operation on the live streaming room consolidation request, the acceptance response of the consolidation request to the server comprises:
sending, in response to the accept operation on the first live streaming room consolidation request, an acceptance response of the first consolidation request to the server, wherein the acceptance response of the first consolidation request is configured to indicate the server to close the second live streaming room, and add the second client to the first live streaming room.

7. The method according to claim 6, wherein
the live streaming room consolidation request further comprises a second live streaming room consolidation request, sent by the first client in response to receiving a select operation on a join control corresponding to the second client in the consolidation selection list;
receiving and displaying the live streaming room consolidation request from the first client through the server comprises:

receiving and displaying the second live streaming room consolidation request from the first client via the server;

sending, in response to the accept operation on the live streaming room consolidation request, the acceptance response of the consolidation request to the server comprises:

sending, in response to an accept operation on the second live streaming room consolidation request, an acceptance response of a second consolidation request to the server, wherein the acceptance response of the second consolidation request is configured to indicate the server to close the first live streaming room, and add the first client to the second live streaming room; and the method further comprises:

displaying, in the live streaming interface of the second live streaming room, the first client added to the second live streaming room.

8. The method according to claim 5, wherein upon receiving and displaying the live streaming room consolidation request from the first client via the server, the method further comprises:

sending, in response to a first reject operation on the live streaming room consolidation request, a first rejection response to the server, wherein the server is configured to send a reject consolidation instruction to the first client; and sending, in response to a second reject operation on the live streaming room consolidation request, a second rejection response to the server, wherein the server is configured to send a reject consolidation instruction to the first client, and delete a preset identification corresponding to the second client, and the preset identification is configured to indicate that the live streaming room satisfies the live streaming room consolidation condition.

9. A multi-user live streaming method, applicable to a server, the method comprising:

receiving a live streaming room consolidation request from a first client, wherein the live streaming room consolidation request is generated by the first client in response to receiving a select operation on a target client in a consolidation selection list, the consolidation selection list is displayed in response to a first live streaming room created by the first client satisfying a live streaming room consolidation condition, wherein the live streaming room consolidation condition is a condition that a quantity of audiences and quests in the first live streaming room is less than a threshold within a preset duration, the consolidation selection list comprises a client identification of at least one second client, the second client creates a second live streaming room, and the second live streaming room satisfies the live streaming room consolidation condition, and in response to the second client displaying the live streaming room consolidation request, a live streaming participation option is displayed on the second client, such that the second client selects to join the first live streaming room as an audience or quest;

sending the live streaming room consolidation request to the target client; and closing, in response to receiving an acceptance response of the consolidation request from the target client, a live streaming room of the target client, and adding the target client to the first live streaming room.

10. The method according to claim 9, wherein prior to receiving the live streaming room consolidation request from the first client, the method comprises:

receiving a live streaming room query request from the first client, wherein the live streaming room query request is sent in response to the first live streaming room satisfying the live streaming room consolidation condition;

querying the second live streaming room satisfying the live streaming room consolidation condition based on the live streaming room query request; and feeding back a client identification of the second client corresponding to the second live streaming room to the first client, wherein the first client is configured to display the consolidation selection list based on the client identification of the second client.

11. The method according to claim 10, wherein upon receiving the live streaming room query request from the first client, the method further comprises:

setting a preset identification for the first live streaming room, wherein the preset identification is configured to indicate that the first live streaming room supports live streaming room consolidation;

querying the second live streaming room satisfying the live streaming room consolidation condition based on the live streaming room query request comprises:

determining a live streaming room containing the preset identification as the second live streaming room; and upon sending the live streaming room consolidation request to the target client, the method further comprises:

deleting the preset identification corresponding to the first live streaming room.

12. The method according to claim 11, wherein upon sending the live streaming room consolidation request to the target client, the method further comprises:

in response to receiving a first rejection response from the target client, sending a reject consolidation instruction to the first client; or in response to receiving a second rejection response from the target client, sending a reject consolidation instruction to the first client, and delete the preset identification of the live streaming room corresponding to the target client.

13. The method according to claim 9, wherein adding the target client to the first live streaming room comprises:

in response to a quantity of clients having first identities in the first live streaming room not reaching a threshold, adding the target client to the first live streaming room, and setting the target client as a first identity; or in response to a quantity of clients having first identities in the first live streaming room reaching a threshold, adding the target client to the first live streaming room, and setting the target client as a second identity, setting an identity setting priority for the target client based on an adding moment of the target client, and in response to the quantity of clients having the first identities in the first live streaming room not reaching the threshold, setting the target client as the first identity based on the identity setting priority;

wherein the first identity has an authority of performing audio and video communication with the first client, and the second identity does not have the authority of performing audio and video communication with the first client.

14. A terminal, comprising a processor and a memory, wherein the memory stores at least one instruction, at least one program, a code set, or an instruction set, and the processor, when loading and executing the at least one instruction, the at least one program, the code set, or the instruction set, is caused to perform the multi-user live streaming method as defined in claim 1.

15. A server, comprising a processor and a memory, wherein the server stores at least one instruction, at least one program, a code set, or an instruction set, and the processor, when loading and executing the at least one instruction, the at least one program, the code set, or the instruction set, is caused to perform the multi-user live streaming method as defined in claim 9.

16. A non-transitory computer readable storage medium, wherein the computer readable storage medium stores at least one instruction, at least one program, a code set, or an instruction set, and a processor, when loading and executing the at least one instruction, the at least one program, the code set, or the instruction set, is caused to perform the multi-user live streaming method as defined in claim 1.

17. A terminal, comprising a processor and a memory, wherein the memory stores at least one instruction, at least one program, a code set, or an instruction set, and the processor, when loading and executing the at least one instruction, the at least one program, the code set, or the instruction set, is caused to perform the multi-user live streaming method as defined in claim 5.

18. A non-transitory computer readable storage medium, wherein the computer readable storage medium stores at least one instruction, at least one program, a code set, or an instruction set, and a processor, when loading and executing the at least one instruction, the at least one program, the code set, or the instruction set, is caused to perform the multi-user live streaming method as defined in claim 5.

19. A non-transitory computer readable storage medium, wherein the computer readable storage medium stores at least one instruction, at least one program, a code set, or an instruction set, and a processor, when loading and executing the at least one instruction, the at least one program, the code set, or the instruction set, is caused to perform the multi-user live streaming method as defined in claim 9.

\* \* \* \* \*

UNITED STATES PATENT AND TRADEMARK OFFICE
CERTIFICATE OF CORRECTION

| | | |
|---|---|---|
| PATENT NO. | : 12,356,025 B2 | Page 1 of 1 |
| APPLICATION NO. | : 18/247414 | |
| DATED | : July 8, 2025 | |
| INVENTOR(S) | : Siyuan Cai, Siyang Xiao and Peixun Zhong | |

It is certified that error appears in the above-identified patent and that said Letters Patent is hereby corrected as shown below:

On the Title Page

At (73), the text "Assignee: BIGO TECHNOLOGY PTE. LTD., Singapore (CN)" should read --Assignee: BIGO TECHNOLOGY PTE. LTD., Singapore (SG)--.

In the Claims

Claim 5, Column 26, Lines 16-17, the text "an audience or quest" should read --an audience or guest--.

Claim 9, Column 27, Line 61, the text "an audience or quest" should read --an audience or guest--.

Signed and Sealed this
Second Day of September, 2025

Coke Morgan Stewart
*Acting Director of the United States Patent and Trademark Office*